United States Patent
Pahwa

(10) Patent No.: US 11,281,379 B2
(45) Date of Patent: Mar. 22, 2022

(54) STORAGE DEVICE AND OPERATING METHOD THEREOF FOR STORING REPLICATED DATA BASED ON ACCESS FREQUENCY

(71) Applicant: Samsung Electronics Co., Ltd., Suwon-si (KR)

(72) Inventor: Shiva Pahwa, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 16/874,871

(22) Filed: May 15, 2020

(65) Prior Publication Data

US 2021/0089219 A1   Mar. 25, 2021

(30) Foreign Application Priority Data

Sep. 23, 2019 (KR) .................. 10-2019-0116814

(51) Int. Cl.
*G06F 12/06* (2006.01)
*G06F 3/06* (2006.01)

(52) U.S. Cl.
CPC .......... *G06F 3/0617* (2013.01); *G06F 3/0653* (2013.01); *G06F 3/0683* (2013.01); *G06F 12/0646* (2013.01); *G06F 2212/202* (2013.01)

(58) Field of Classification Search
None
See application file for complete search history.

(56) References Cited

U.S. PATENT DOCUMENTS

| | | | |
|---|---|---|---|
| 8,417,882 | B2 | 4/2013 | Tanaka et al. |
| 9,043,668 | B2 | 5/2015 | Goss et al. |
| 9,218,499 | B2 | 12/2015 | Furuichi et al. |
| 9,665,287 | B2 | 5/2017 | Li et al. |
| 9,671,974 | B2 | 6/2017 | Kaczmarczyk et al. |
| 9,690,801 | B1 | 6/2017 | Ioannou et al. |
| 9,811,457 | B2 | 11/2017 | Davis et al. |
| 10,282,128 | B2 | 5/2019 | Rudelic |
| 2009/0217091 | A1* | 8/2009 | Miyamoto .......... G06F 11/1453 714/19 |
| 2010/0205389 | A1* | 8/2010 | Kishi .................. G06F 11/1453 711/162 |

(Continued)

FOREIGN PATENT DOCUMENTS

JP         6106719 B2    4/2017

*Primary Examiner* — Tracy C Chan
(74) *Attorney, Agent, or Firm* — Muir Patent Law, PLLC

(57) ABSTRACT

An operating method of a storage device which includes one or more nonvolatile memories includes storing reference data in a first memory area of the one or more nonvolatile memories, when an access frequency of the reference data exceeds a first reference value, storing first replicated data identical to the reference data in a second memory area of the one or more nonvolatile memories, after the first replicated data are stored, when an access frequency of the reference data or the first replicated data exceeds the first reference value, storing second replicated data identical to the reference data in a third memory area of the one or more nonvolatile memories, and managing a second and a third physical addresses of the second and the third memory areas such that a first physical address of the first memory area corresponds to the second and the third physical addresses.

10 Claims, 16 Drawing Sheets

(56) References Cited

U.S. PATENT DOCUMENTS

| | | | |
|---|---|---|---|
| 2010/0223495 A1* | 9/2010 | Leppard | G06F 11/004 714/6.11 |
| 2014/0173188 A1* | 6/2014 | Sakamoto | G06F 11/1456 711/103 |
| 2016/0077988 A1* | 3/2016 | Tipton | G06F 3/068 710/308 |
| 2018/0232144 A1* | 8/2018 | Pahwa | G06F 3/0679 |

* cited by examiner

STORAGE DEVICE AND OPERATING METHOD THEREOF FOR STORING REPLICATED DATA BASED ON ACCESS FREQUENCY

CROSS-REFERENCE TO RELATED APPLICATIONS

This application claims priority under 35 U.S.C. § 119 to Korean Patent Application No. 10-2019-0116814 filed on Sep. 23, 2019, in the Korean Intellectual Property Office, the disclosure of which is incorporated by reference herein in its entirety.

BACKGROUND

Various example embodiments of the inventive concept disclosed herein relate to a semiconductor device, and more particularly, relate to a storage device for managing data stored in a nonvolatile memory and an operating method thereof.

A storage device refers to a device, which stores data under control of a host device, such as a computer, a smartphone, a smart pad, etc. The storage device includes a device, which stores data on a magnetic disk, such as a hard disk drive (HDD), or a device, which stores data in a semiconductor memory, in particular, a nonvolatile memory, such as a solid state drive (SSD) or a memory card.

A nonvolatile memory device includes a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), a ferroelectric RAM (FRAM), etc.

The storage device performs data deduplication for the purpose of storing a large amount of data in the storage device having a limited capacity. The storage device may store only one or more of a plurality of data having the same value through the deduplication. As such, the amount of data to be stored in the storage device may decrease. However, in the case where one or more of a plurality of data are stored in the storage device through the deduplication, the stored data may be frequently accessed. In this case, the performance and reliability of the storage device may decrease. Accordingly, there is a need to secure the reliability of the storage device while improving the performance of the storage device.

SUMMARY

Various example embodiments of the inventive concept provide a storage device capable of securing the reliability of frequently accessed data even though deduplication is performed.

According to an exemplary embodiment, an operating method of a storage device which includes one or more nonvolatile memories includes storing reference data in a first memory area of the one or more nonvolatile memories, when an access frequency of the reference data exceeds a first reference value, storing first replicated data identical to the reference data in a second memory area of the one or more nonvolatile memories, after the first replicated data are stored, when an access frequency of the reference data or the first replicated data exceeds the first reference value storing second replicated data identical to the reference data in a third memory area of the one or more nonvolatile memories, and managing a second physical address of the second memory area and a third physical address of the third memory area such that a first physical address of the first memory area corresponds to the second physical address and the third physical address, as the first and second replicated data are stored in the one or more nonvolatile memories.

According to an exemplary embodiment, an operating method of a storage device which includes one or more nonvolatile memories includes storing reference data in a first memory area of the one or more nonvolatile memories, storing deduplication ratio for the reference data, storing first replicated data identical to the reference data in a second memory area of the one or more nonvolatile memories when the deduplication ratio for the reference data exceeds a reference ratio, after the first replicated data are stored, storing second replicated data identical to the reference data in a third memory area of the one or more nonvolatile memories when an access frequency of one of the reference data and the first replicated data exceeds a first reference value, and managing a second physical address of the second memory area and a third physical address of the third memory area such that a first physical address of the first memory area corresponds to the second physical address and the third physical address, as the first and second replicated data are stored in the one or more nonvolatile memories.

According to an exemplary embodiment, a storage device includes one or more nonvolatile memories that include a first memory area configured to store reference data, and a memory controller. The storage device is configured such that when an access frequency of the reference data exceeds a first reference value, the memory controller stores first replicated data identical to the reference data in a second memory area of the one or more nonvolatile memories. The storage device is configured such that after the first replicated data are stored, when an access frequency of one of the reference data and the first replicated data exceeds the first reference value, the memory controller stores second replicated data identical to the reference data in a third memory area of the one or more nonvolatile memories. The memory controller is configured to: store a second physical address of the second memory area in an address management table so as to correspond to a first physical address of the first memory area as the first replicated data are stored in the second memory area, and store a third physical address of the third memory area in the address management table so as to correspond to the second physical address as the second replicated data are stored in the third memory area.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, various example embodiments of the inventive concept may be described in detail and clearly to such an extent that an ordinary one in the art easily implements the inventive concept.

Figure 1:
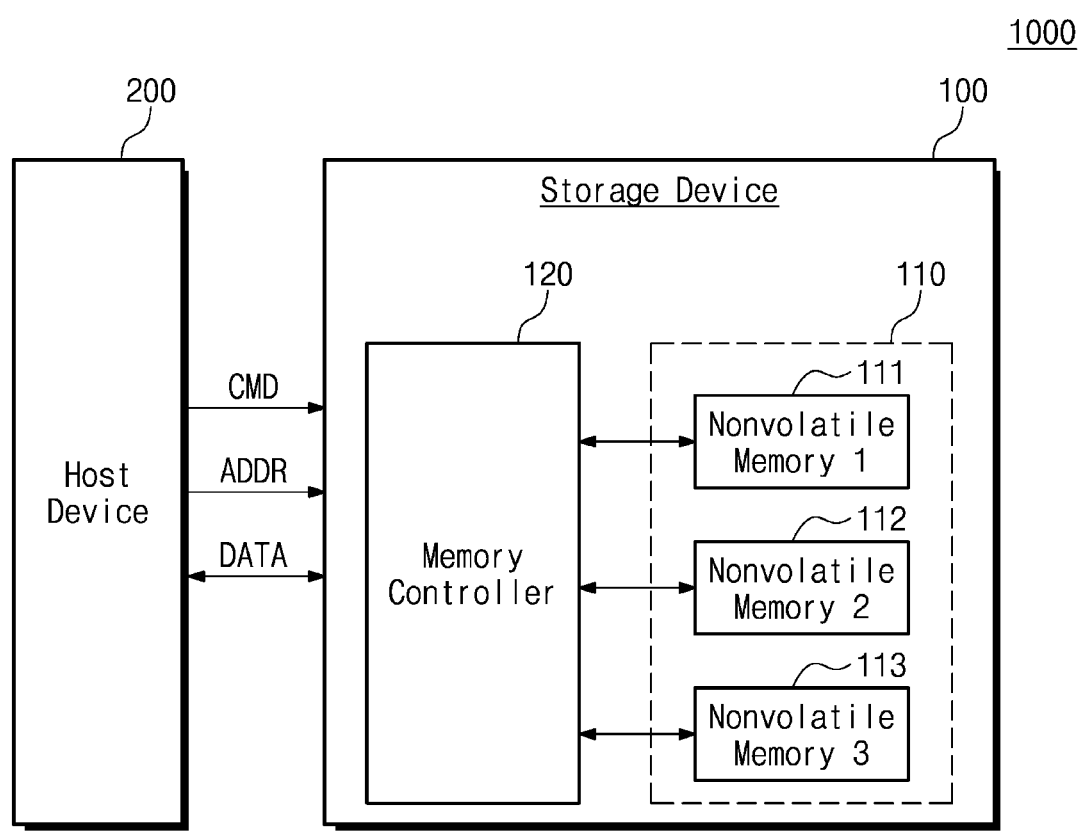
FIG. 1 is a block diagram illustrating a storage system according to an example embodiment of the inventive concept.

FIG. 1 is a block diagram illustrating a storage system according to an example embodiment of the inventive concept. A storage system 1000 may include a storage device 100 and a host device 200. In some embodiments, the storage system 1000 may be implemented with one electronic device. For example, the storage system 1000 may be one of various electronic devices such as home appliances, a desktop computer, a laptop computer, a tablet computer, a smartphone, an electric vehicle, a wearable device, a video game console, etc. In an example embodiment, the storage system 1000 may be implemented with a plurality of electronic devices. For example, the storage device 100 and the host device 200 may be separate electronic devices and may be locally or remotely connected to implement the storage system 1000.

The host device 200 may control various operations of the storage device 100. To this end, the host device 200 may transmit a command CMD to the storage device 100. For example, to store data "DATA" in the storage device 100, the host device 200 may transmit a command CMD (e.g., a write command) indicating a write operation, an address ADDR, and the data "DATA" to the storage device 100. The storage device 100 may store the data "DATA" in response to the write command CMD. For example, to output the data "DATA" from the storage device 100, the host device 200 may transmit a command CMD (e.g., a read command) indicating a read operation and the address ADDR to the storage device 100. The storage device 100 may output the data "DATA" to the host device 200 in response to the read command CMD.

In an example embodiment, the host device 200 may be implemented to include one or more processor cores. For example, the host device 200 may include a general-purpose processor, a dedicated processor, or an application processor. The host device 200 may be a processor itself or may be an electronic device or a system including a processor(s).

The storage device 100 may include one or more nonvolatile memories 110 and a memory controller 120. An example embodiment is illustrated in FIG. 1 as the one or more nonvolatile memories 110 including first, second, and third nonvolatile memories 111, 112, and 113. However, the inventive concept is not limited thereto. For example, the number of nonvolatile memories included in the storage device 100 may be variously changed or modified.

Each of the first, second, and third nonvolatile memories 111, 112, and 113 may store the data "DATA" provided by the host device 200. To this end, each of the first, second, and third nonvolatile memories 111, 112, and 113 may include a memory area(s) for storing the data "DATA". For example, when each of the first, second, and third nonvolatile memories 111, 112, and 113 includes a NAND-type flash memory, each of the first, second, and third nonvolatile memories 111, 112, and 113 may include a memory cell array of memory cells formed along a plurality of word lines and a plurality of bit lines. However, the inventive concept is not limited thereto. For example, each of the first, second, and third nonvolatile memories 111, 112, and 113 may include one or more of various nonvolatile memories such as a phase random access memory (PRAM), a magnetic random access memory (MRAM), a resistive random access memory (RRAM, or ReRAM), and a ferroelectric random access memory (FRAM).

The memory controller 120 may control overall operations of the storage device 100. For example, the memory controller 120 may schedule operations of the nonvolatile memories 110 or may encode and decode data that are processed in the storage device 100. For example, under control of the memory controller 120, an internal management operation (e.g., a read reclaim operation or a garbage collection operation) may be performed on data stored in the nonvolatile memories 110. For example, under control of the memory controller 120, the data "DATA" provided from the host device 200 may be stored in the nonvolatile memories 110, or the data "DATA" output from the nonvolatile memories 110 may be provided to the host device 200.

In an exemplary embodiment, the first, second, and third nonvolatile memories 111, 112, and 113 may be implemented with different semiconductor dies or semiconductor chips and may be mounted on a printed circuit board (PCB) included in the storage device 100. In this case, the memory controller 120 may control the first, second, and third nonvolatile memories 111, 112, and 113 in parallel. For example, the memory controller 120 may output data respectively stored in the first nonvolatile memory 111, the second nonvolatile memory 112, and the third nonvolatile memory 113 in parallel from the first nonvolatile memory 111, the second nonvolatile memory 112, and the third nonvolatile memory 113.

In an exemplary embodiment, the memory controller 120 may perform deduplication such that data having the same value are not duplicated and stored in the nonvolatile memories 110 in a write operation. For example, when a write request for the data "DATA" is received from the host device 200, the memory controller 120 may compare the data "DATA" provided from the host device 200 with data previously stored in the nonvolatile memories 110. When the same data as the data "DATA" provided from the host device 200 are previously stored in the nonvolatile memories 110, the write-requested data "DATA" may not be stored in the nonvolatile memories 110. For example, only one or more data of a plurality of data may be stored in the nonvolatile memories 110 through the deduplication. Below, for convenience of description, data stored in the nonvolatile memories 110 from among a plurality of data having the same value depending on the deduplication are referred to as "reference data".

In an exemplary embodiment, the memory controller 120 may replicate the reference data depending on information about the reference data and may store the replicated data in the nonvolatile memories 110. For example, the memory controller 120 may replicate the reference data based on an access frequency (i.e., the number of times of an access per unit time) of the reference data. The reference data may be accessed due to various causes (e.g., as the reference data are stored, read, or modified). When the access frequency of the reference data exceeds a first reference value, the memory controller 120 may replicate the reference data. In the case where the reference data and the replicated data are stored in the nonvolatile memories 110, because accesses to the reference data are distributed into the replicated data, the number of times of a direct access to the reference data or a direct access frequency of the reference data may decrease.

In an exemplary embodiment, the memory controller 120 may remove (or invalidate) the reference data or the replicated data stored in the nonvolatile memories 110 depending on information associated with the reference data and the replicated data. For example, when the access frequency of the reference data and the replicated data is a second reference value or smaller, the memory controller 120 may remove the reference data or the replicated data. As such, among a plurality of data having the same value, the remaining data other than only one or more data may be removed from the nonvolatile memories 110. Here, to remove or invalidate data may mean to physically erase the data of memory cells or may mean to release address mapping associated with a physical address at which the data are stored.

As described above, the memory controller 120 may replicate reference data (i.e., hot data) frequently accessed while performing the deduplication. As such, an error due to an excessive access to reference data (e.g., an error due to read disturbance) may be prevented, and thus, the reliability of the storage device 100 may be improved. Also, the memory controller 120 may remove reference data or replicated data (i.e., cold data) when the data are rarely accessed. As such, the memory controller 120 may secure an available capacity of the nonvolatile memories 110 while maintaining the reliability of data.

The memory controller 120 may include a hardware component, a software component, or a hybrid component thereof for the purpose of performing the operations described above and operations to be described below. For example, the memory controller 120 may include a dedicated hardware circuit configured to perform a particular operation. Additionally or alternatively, the memory controller 120 may include one or more processor cores that execute an instruction set of a program code configured to perform a particular operation.

Figure 2:
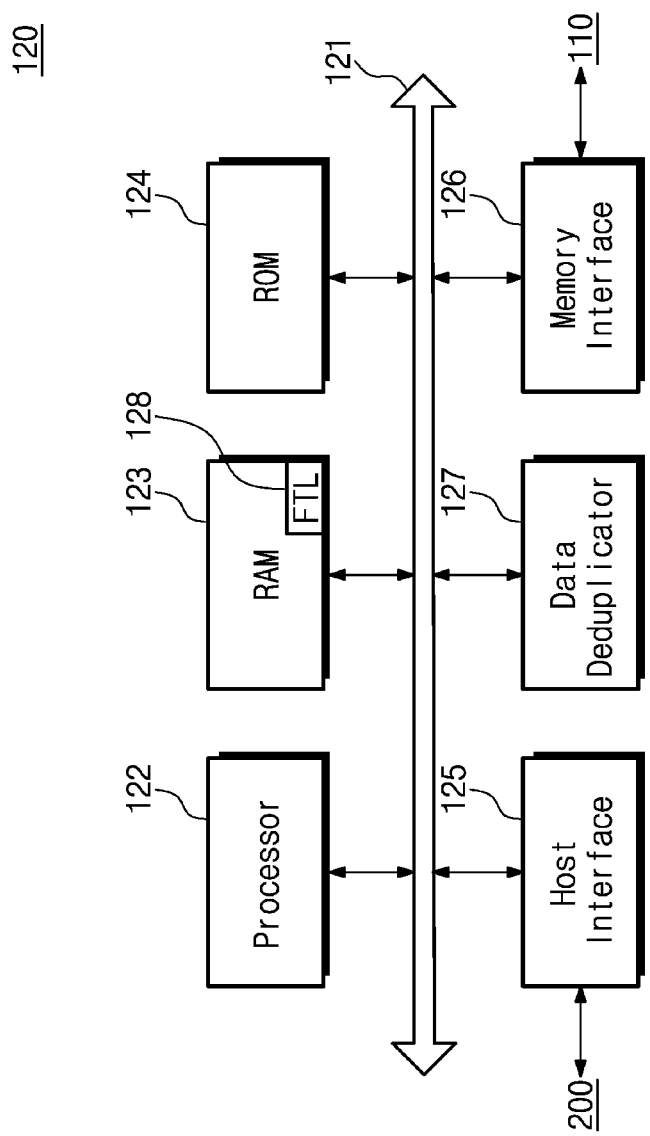
FIG. 2 is a block diagram illustrating an exemplary configuration of a memory controller of FIG. 1 according to example embodiments.

FIG. 2 is a block diagram illustrating an exemplary configuration of a memory controller of FIG. 1 according to example embodiments. For a brief description, only some components of the memory controller 120 are illustrated in FIG. 2. However, the inventive concept is not limited thereto. For example, the memory controller 120 may further include any other components such as an error correction code (ECC) circuit.

Referring to FIG. 2, the memory controller 120 may include a system bus 121, a processor 122, a random access memory (RAM) 123, a read only memory (ROM) 124, a host interface 125, a memory interface 126, and a data deduplicator 127.

The system bus 121 is configured to provide a channel between components of the memory controller 120. The processor 122 may control overall operations of the memory controller 120. The RAM 123 may be used as a buffer memory, a cache memory, or a working memory of the memory controller 120. The RAM 123 may store codes and commands that the processor 122 executes. The RAM 123 may store data that are processed by the processor 122. The ROM 124 may store a variety of information, which is necessary for the memory controller 120 to operate, in the form of firmware.

The memory controller 120 may communicate with the host device 200 through the host interface 125. The memory controller 120 may communicate with the nonvolatile memories 110 through the memory interface 126.

In an exemplary embodiment, a flash translation layer (FTL) 128 may be stored in the RAM 123. The FTL 128 that is a software layer to perform a software operation of the memory controller 120 may be driven by the processor 122. The FTL 128 may perform various maintenance operations between the host device 200 and the nonvolatile memories 110 such that the nonvolatile memories 110 are efficiently used.

For example, the FTL 128 may perform a translation operation between a logical address and a physical address. A logical address may be information managed by a file system of the host device 200, and the address ADDR transmitted from the host device 200 to the storage device 100 may correspond to the logical address. A physical address is information indicating a physical location of a memory area, at which data are stored, of the nonvolatile memories 110. The FTL 128 may manage the address translation operation through an address mapping table.

In an exemplary embodiment, the FTL 128 may manage meta data associated with a physical address. For example, the FTL 128 may manage a read count, a write time, a program/erase (P/E) cycle, etc. associated with data stored at an area corresponding to a physical address. In this case, meta data corresponding to the physical address may be stored in the RAM 123.

The data deduplicator 127 may drive the FTL 128 and may perform data deduplication. In an exemplary embodiment, the data deduplicator 127 may perform the deduplication on data having the same value depending on a deduplication ratio. For example, in the case where the deduplication ratio is 20:1, the data deduplicator 127 may store one data of 20 data having the same value in the nonvolatile memories 110 as the reference data. For example, 20:1 deduplication ratio may mean that twenty times more data is protected than a physical space required to store it. In example embodiments, the deduplication ratio of a memory area may be a ratio of an address space having deduplicated data to a total address space of the memory area corresponding to the duplicated data. In other example embodiments, the deduplication ratio of a memory area may be calculated by a ratio of the number of logical address having deduplicated data to the number of total logical address of the memory area corresponding to the duplicated data. The deduplication ratio may vary depending on a request of the host device 200 or an internal algorithm of the memory controller 120. The deduplication ratio may be differently managed for each data. For example, in the case where an image or image data are provided to the storage device 100, the deduplication ratio associated with the image or the image data may be increased. For example, the deduplication ratio may vary depending on an operating situation (or condition) of the storage device 100. In some examples, the deduplication ratio may be stored in the storage device 100.

The data deduplicator 127 may replicate the reference data depending on information (e.g., an access frequency) associated with the reference data or may remove the reference data or the replicated data depending on information (e.g., an access frequency) associated with the reference data or the replicated data.

An example embodiment is illustrated in FIG. 2 as the data deduplicator 127 is independent of the processor 122 or the FTL 128, but the inventive concept is not limited thereto. For example, operations associated with the data deduplication, data replication, and data removal of the data deduplicator 127 may be performed by the processor 122 or the FTL 128.

Figure 3:
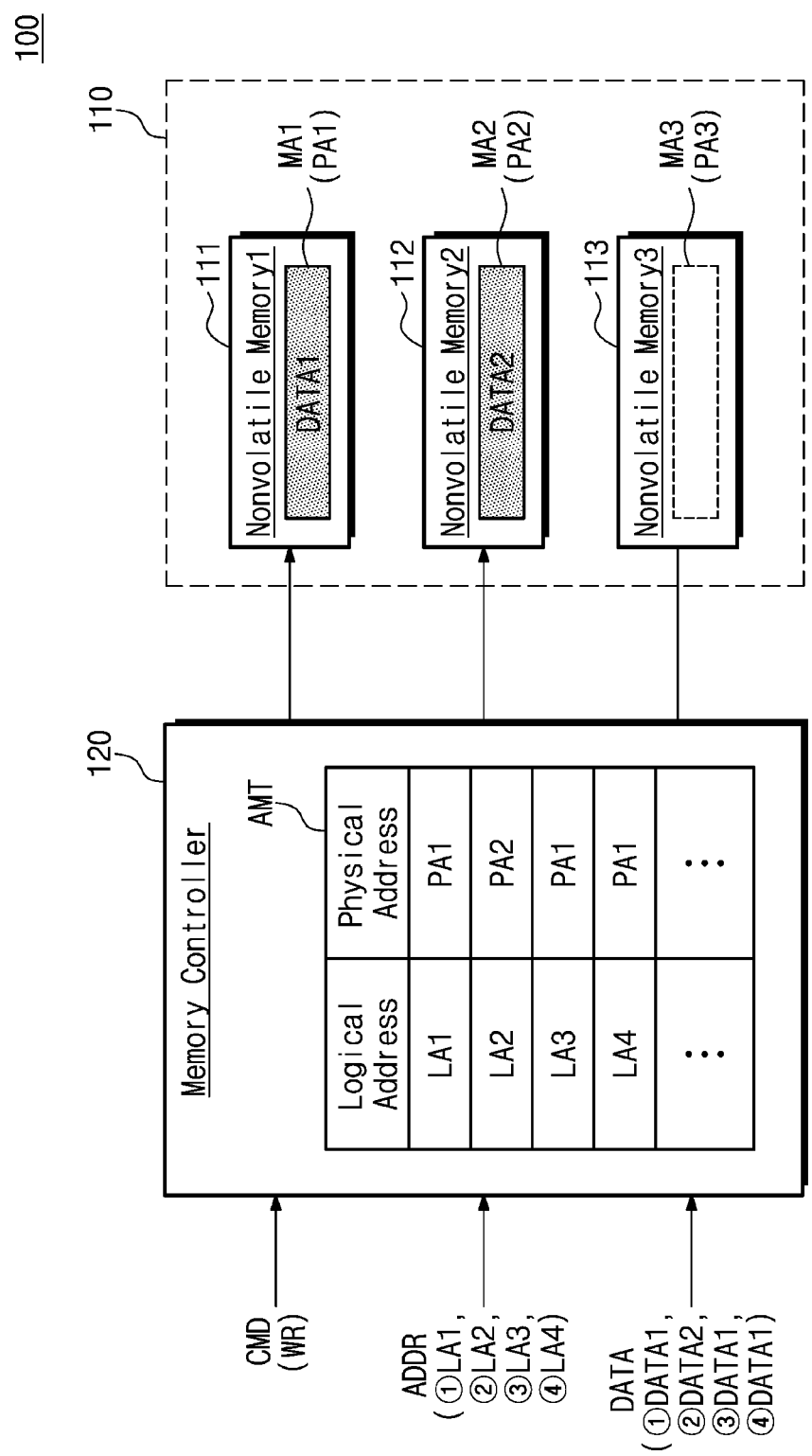
FIG. 3 illustrates an example of data removal that a storage device of FIG. 1 performs, according to example embodiments.

FIG. 3 illustrates an example embodiment of data deduplication that a storage device of FIG. 1 performs, according to example embodiments. Referring to FIG. 3, the memory controller 120 may perform the data deduplication based on an address mapping table AMT including mapping information of a logical address and a physical address. For example, the address mapping table AMT may be stored in the RAM 123 of FIG. 2 and may be managed by the FTL 128.

The memory controller 120 may receive a command CMD indicating a write operation WR, an address ADDR, and data "DATA" from the host device 200. For example, the memory controller 120 may sequentially receive first to fourth logical addresses LA1 to LA4 as the address ADDR and data DATA1, DATA2, DATA1, and DATA1. In this case, the data DATA1, DATA2, DATA1, and DATA1 may correspond to the first to fourth logical addresses LA1 to LA4, respectively. The memory controller 120 may perform a write operation depending on the order of receiving the address ADDR and the data "DATA".

First, in the case where the first logical address LA1 and the first data DATA1 are received, the memory controller 120 may determine whether the same data as the first data DATA1 are present in the nonvolatile memories 110. For example, the memory controller 120 may in advance store data stored in areas of the nonvolatile memories 110 corresponding to particular physical addresses in an internal memory (e.g., the RAM 123 of FIG. 2) of the memory controller 120. The memory controller 120 may compare the first data DATA1 with the data stored in advance in the internal memory. When it is determined that the same data as the first data DATA1 are absent from the internal memory, as illustrated in FIG. 3, the memory controller 120 may store the first data DATA1 in the first nonvolatile memory 111. In this case, the first nonvolatile memory 111 may store the first data DATA1 in a first memory area MA1. The first memory area MA1 may correspond to a first physical address PA1. As the first data DATA1 are stored in the first memory area MA1, the memory controller 120 may store mapping information of the first logical address LA1 and the first physical address PA1 in the address mapping table AMT.

Second, in the case where the second logical address LA2 and the second data DATA2 are received, the memory controller 120 may determine whether the same data as the second data DATA2 are present in the nonvolatile memories 110. When it is determined that the same data as the second data DATA2 are absent from the nonvolatile memories 110, as illustrated in FIG. 3, the memory controller 120 may store the second data DATA2 in the second nonvolatile memory 112. In this case, the second nonvolatile memory 112 may store the second data DATA2 in a second memory area MA2. The second memory area MA2 may correspond to a second physical address PA2. As the second data DATA2 are stored in the second memory area MA2, the memory controller 120 may store mapping information of the second logical address LA2 and the second physical address PA2 in the address mapping table AMT.

Third, in the case where the third logical address LA3 and the first data DATA1 are received, the memory controller 120 may determine whether the same data as the first data DATA1 are present in the nonvolatile memories 110. As illustrated in FIG. 3, because the first data DATA1 are previously stored in the first nonvolatile memory 111, the memory controller 120 may determine that the same data as the first data DATA1 are present in the nonvolatile memories 110. As such, the memory controller 120 may not store the received first data DATA1 in the nonvolatile memories 110 for the deduplication. Because the received first data DATA1 are previously stored in the first memory area MA1 corresponding to the first physical address PA1, the memory controller 120 may store mapping information of the third logical address LA3 and the first physical address PA1 in the address mapping table AMT.

Fourth, in the case where the fourth logical address LA4 and the first data DATA1 are received, as described above, the memory controller 120 may not store the received first data DATA1 in the nonvolatile memories 110 for the deduplication. Because the received first data DATA1 are previously stored in the first memory area MA1 corresponding to the first physical address PA1, the memory controller 120 may store mapping information of the fourth logical address LA4 and the first physical address PA1 in the address mapping table AMT.

As described above, depending on a deduplication operation of the memory controller 120, the first data DATA1 corresponding to the first logical address LA1, the third logical address LA3, and the fourth logical address LA4 may be stored in the first nonvolatile memory 111 only once. Also, the second data DATA2 corresponding to the second logical address LA2 may be stored in the second nonvolatile memory 112 only once. For example, because the first data DATA1 and the second data DATA2 are stored in the nonvolatile memories 110 depending on the deduplication, the first data DATA1 and the second data DATA2 may be reference data.

An example embodiment is illustrated in FIG. 3 as the first data DATA1 and the second data DATA2 are stored in the first nonvolatile memory 111 and the second nonvolatile memory 112, but the inventive concept is not limited thereto. For example, the first data DATA1 and the second data DATA2 may be stored in any memory areas of the nonvolatile memories 110.

Below, an operation in which the storage device 100 replicates reference data stored depending on the deduplication will be described in detail with reference to FIGS. 4 to 6, 7A and 7B.

Figure 4:
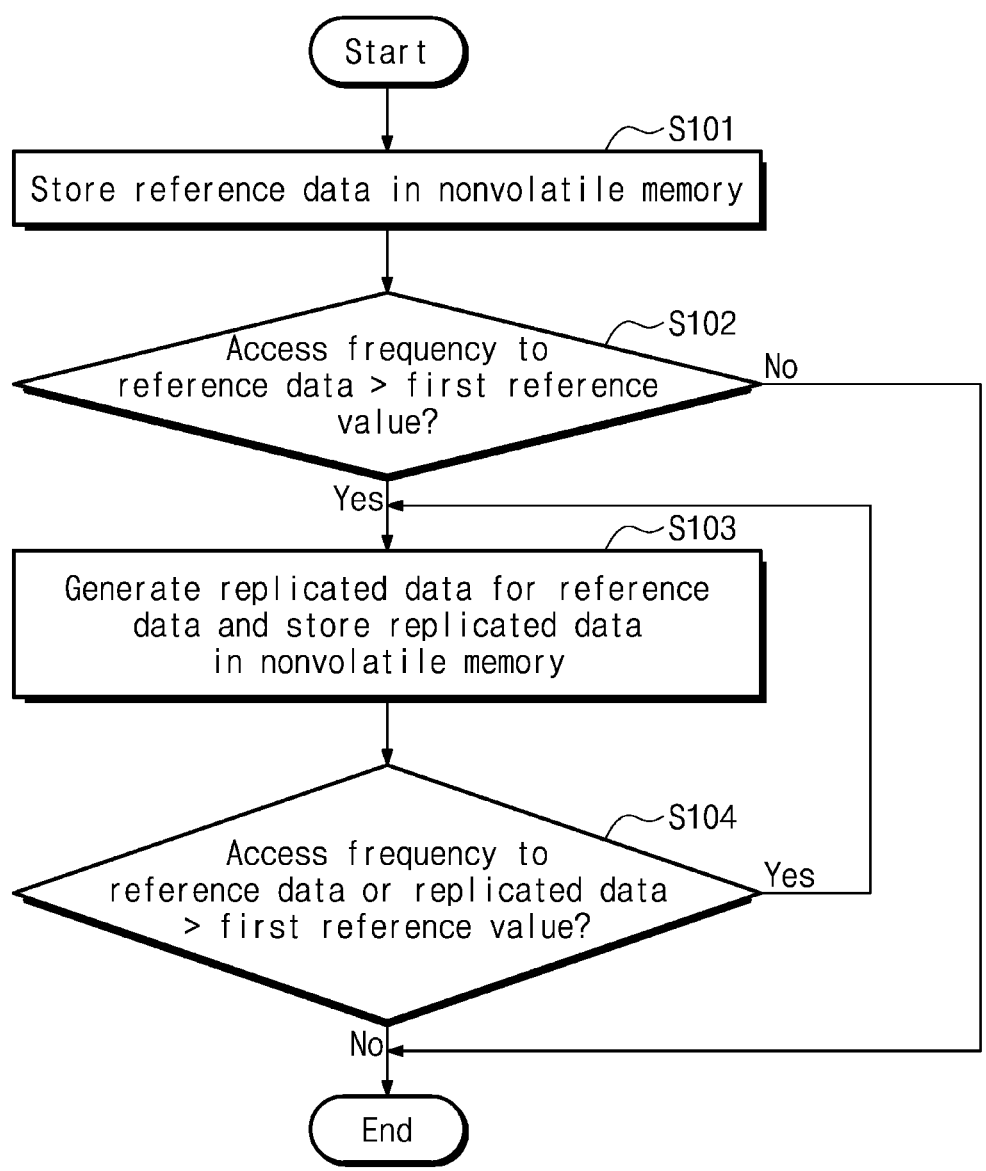
FIG. 4 is a flowchart illustrating an exemplary operation in which a storage device of FIG. 1 replicates reference data, according to example embodiments.

FIG. 4 is a flowchart illustrating an exemplary operation in which a storage device of FIG. 1 replicates reference data, according to example embodiments. Referring to FIGS. 1 and 4, in operation S101, the storage device 100 may store reference data in a nonvolatile memory. For example, the reference data may be data stored in the nonvolatile memory depending on the deduplication from among a plurality of data having the same value.

In operation S102, the storage device 100 may determine whether an access frequency of the reference data exceeds a first reference value. For example, the storage device 100 may determine whether a read count associated with the reference data during a particular time period exceeds the first reference value. For example, assuming that the first data DATA1 of FIG. 3 is the reference data, a read count associated with the reference data (e.g., DATA1) may be increased depending on a read operation corresponding to one of the first logical address LA1, the third logical address LA3, and the fourth logical address LA4. As such, the access frequency of the reference data (e.g., DATA1) may be increased.

When the access frequency of the reference data exceeds the first reference value, in operation S103, the storage device 100 may generate replicated data associated with the reference data (e.g., DATA1) and may store the replicated data in the nonvolatile memory. For example, the storage device 100 may store the replicated data in a nonvolatile memory different from a nonvolatile memory where the reference data (e.g., DATA1) are stored. As such, the replicated data having the same value as the reference data (e.g., DATA1) may be stored in the nonvolatile memory.

In operation S104, the storage device 100 may determine whether an access frequency of the reference data or the replicated data exceeds the first reference value. When the access frequency of the reference data or the replicated data exceeds the first reference value, in operation S103, the storage device 100 may generate replicated data associated with the reference data and may store the replicated data in the nonvolatile memory. As such, a plurality of replicated data may be generated. In this case, the storage device 100 may store new replicated data in a nonvolatile memory different from a nonvolatile memory where the reference data and existing replicated data are stored.

For example, even though an access to reference data is distributed into replicated data, when the reference data continues to be frequently accessed, the storage device 100 may continue to generate replicated data through operation S103 and operation S104.

As described above, even though the storage device 100 performs the deduplication, the storage device 100 may generate replicated data depending on an access frequency of data. In the case where data continue to be frequently accessed even after replicated data are generated, the storage device 100 may additionally generate replicated data. As such, access operations to reference data may be distributed, and an error due to a frequent access to the reference data may be decreased. Accordingly, the reliability of the storage device 100 may be improved. Also, in the case where replicated data are stored in a nonvolatile memory different from a nonvolatile memory where reference data are stored, the reference data and the replicated data may be output in parallel. Accordingly, a speed at which reference data are read may be improved.

Figure 5:
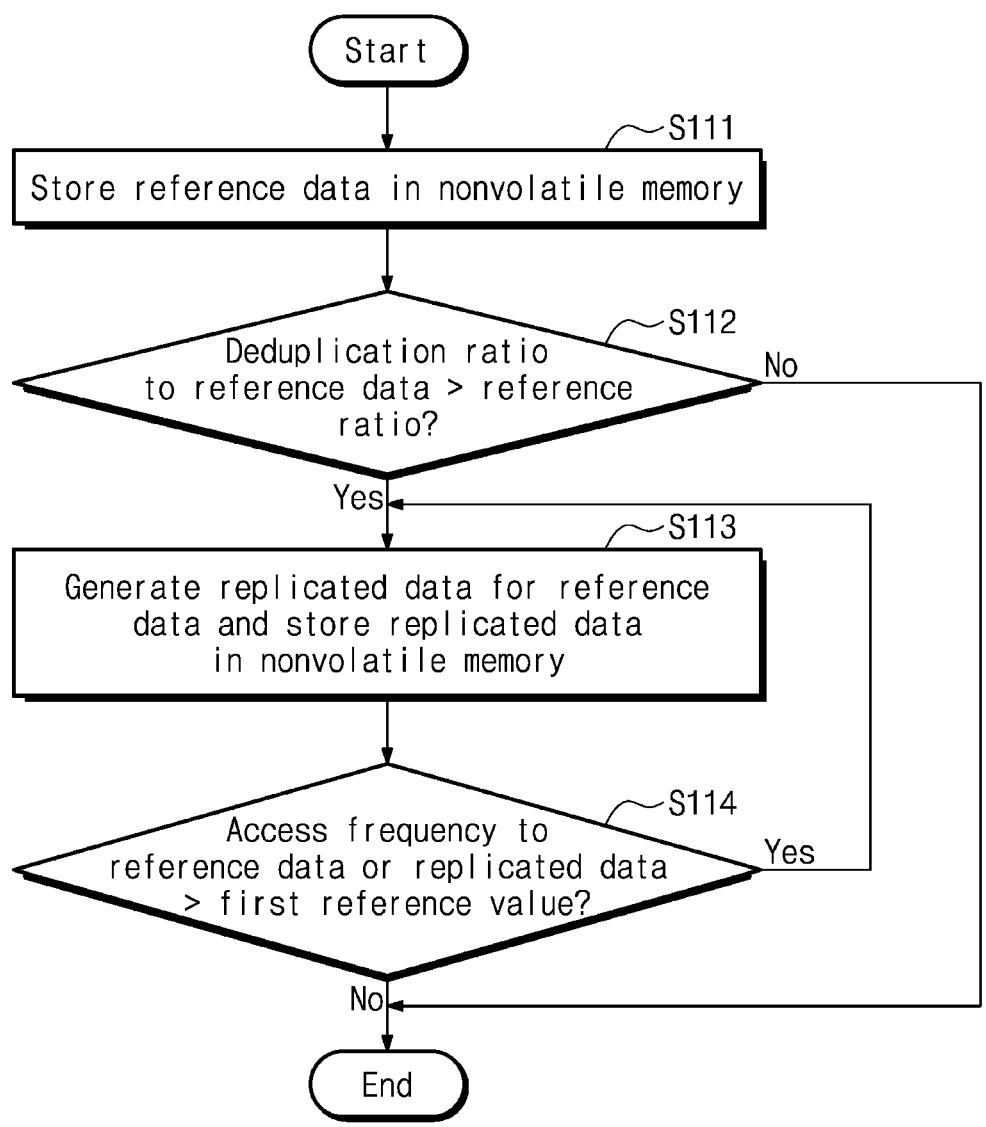
FIG. 5 is a flowchart illustrating another exemplary operation in which a storage device of FIG. 1 replicates reference data, according to example embodiments.

FIG. 5 is a flowchart illustrating another exemplary operation in which a storage device of FIG. 1 replicates reference data, according to example embodiments. Referring to FIGS. 1 and 5, in operation S111, the storage device 100 may store reference data in a nonvolatile memory.

In operation S112, the storage device 100 may determine whether a deduplication ratio associated with the reference data exceeds a reference ratio (e.g., a pre-set threshold ratio). For example, assuming that the first data DATA1 of FIG. 3 are the reference data, the storage device 100 may determine whether the deduplication ratio associated with the first data DATA1 exceeds the reference ratio. In this case (e.g., as shown in FIG. 3), the deduplication ratio to the first data DATA1 is 3:1.

When the deduplication ratio associated with the first data DATA1 exceeds the reference ratio, in operation S113, the storage device 100 may generate replicated data associated with the reference data and may store the replicated data in a nonvolatile memory. For example, the storage device 100 may store the replicated data in a nonvolatile memory different from a nonvolatile memory where the reference data are stored.

In operation S114, the storage device 100 may determine whether an access frequency of the reference data or the replicated data exceeds the first reference value. When the access frequency of the reference data or the replicated data exceeds the first reference value, in operation S113, the storage device 100 may generate replicated data associated with the reference data and may store the replicated data in the nonvolatile memory. As such, a plurality of replicated data may be generated. In this case, the storage device 100 may store new replicated data in a nonvolatile memory different from a nonvolatile memory where the reference data and existing replicated data are stored.

As described above, even though the storage device 100 performs the deduplication, the storage device 100 may generate replicated data depending on a deduplication ratio associated with data and an access frequency of the data.

Figure 6:
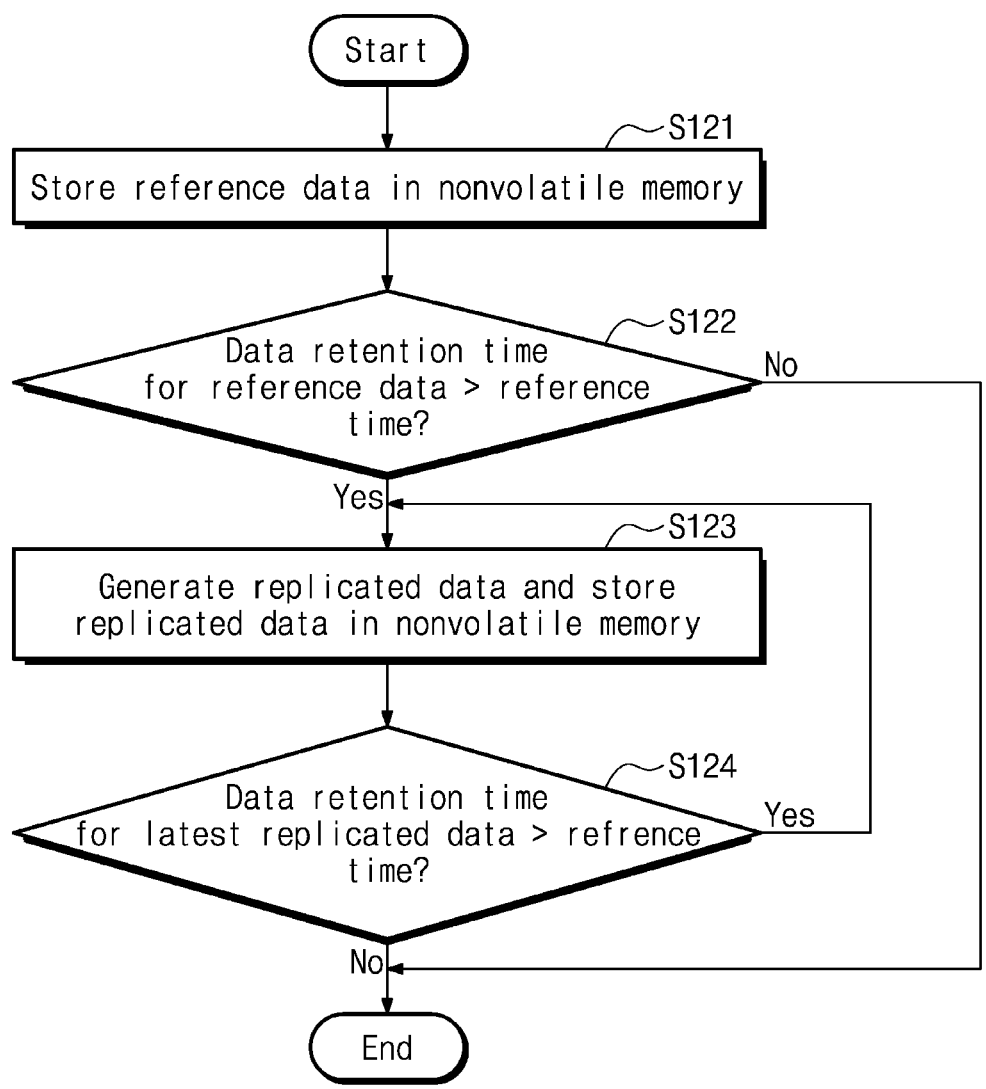
FIG. 6 is a flowchart illustrating another exemplary operation in which a storage device of FIG. 1 replicates reference data, according to example embodiments.

FIG. 6 is a flowchart illustrating another exemplary operation in which a storage device of FIG. 1 replicates reference data, according to example embodiments. Referring to FIGS. 1 and 6, in operation S121, the storage device 100 may store reference data in a nonvolatile memory.

In operation S122, the storage device 100 may determine whether a data retention time associated with the reference data exceeds a reference time. For example, the storage device 100 may calculate a data retention time based on a time (hereinafter referred to as a "write time") when the reference data are written in a nonvolatile memory and may determine whether the calculated data retention time exceeds the reference time. When the calculated data retention time exceeds the reference time, because the probability that a value of the reference data is changed increases, the reliability of data may decrease.

When the data retention time associated with the reference data exceeds the reference time, in operation S123, the storage device 100 may generate replicated data associated with the reference data and may store the replicated data in a nonvolatile memory. For example, the storage device 100 may store the replicated data in a nonvolatile memory different from the nonvolatile memory where the reference data are stored.

In operation S124, the storage device 100 may determine whether a data retention time associated with recently replicated data exceeds the reference time. When the data retention time exceeds the reference time, in operation S123, the storage device 100 may generate replicated data and may store the replicated data in a nonvolatile memory. As such, a plurality of replicated data may be generated. In this case, the storage device 100 may store new replicated data in a nonvolatile memory different from a nonvolatile memory where the reference data and existing replicated data are stored.

As described above, even though the storage device 100 performs the deduplication, the storage device 100 may generate replicated data depending on a data retention time. In the case where a data retention time associated with replicated data exceeds the reference time even after the replicated data are generated, the storage device 100 may additionally generate replicated data. As such, an error due to a change in a value of reference data over time may decrease. Accordingly, the reliability of the storage device 100 may be improved.

Figure 7A:
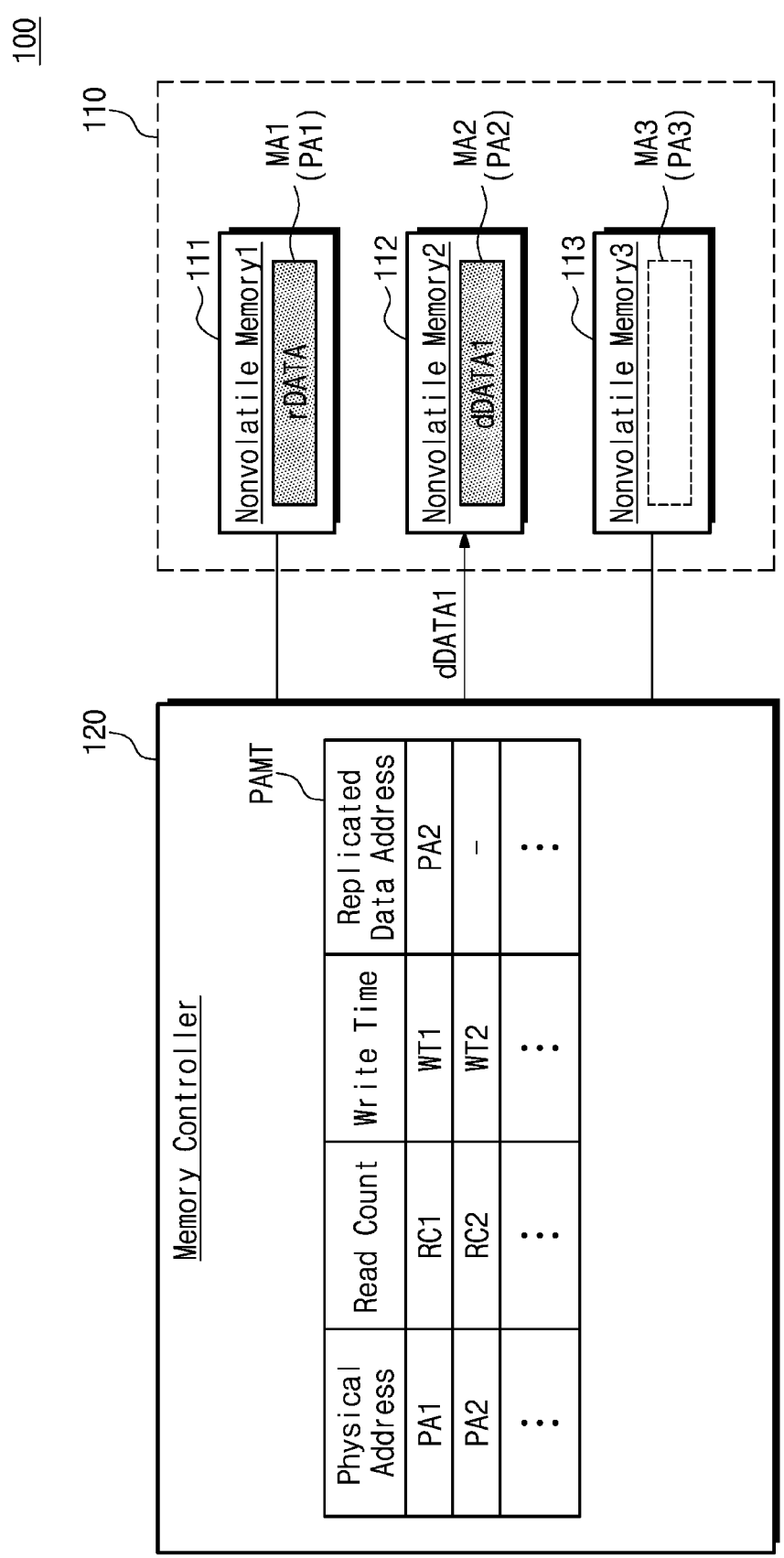
FIGS. 7A and 7B illustrate examples in which a storage device of FIG. 1 generates replicated data according to example embodiments of the inventive concept.
Figure 7B:
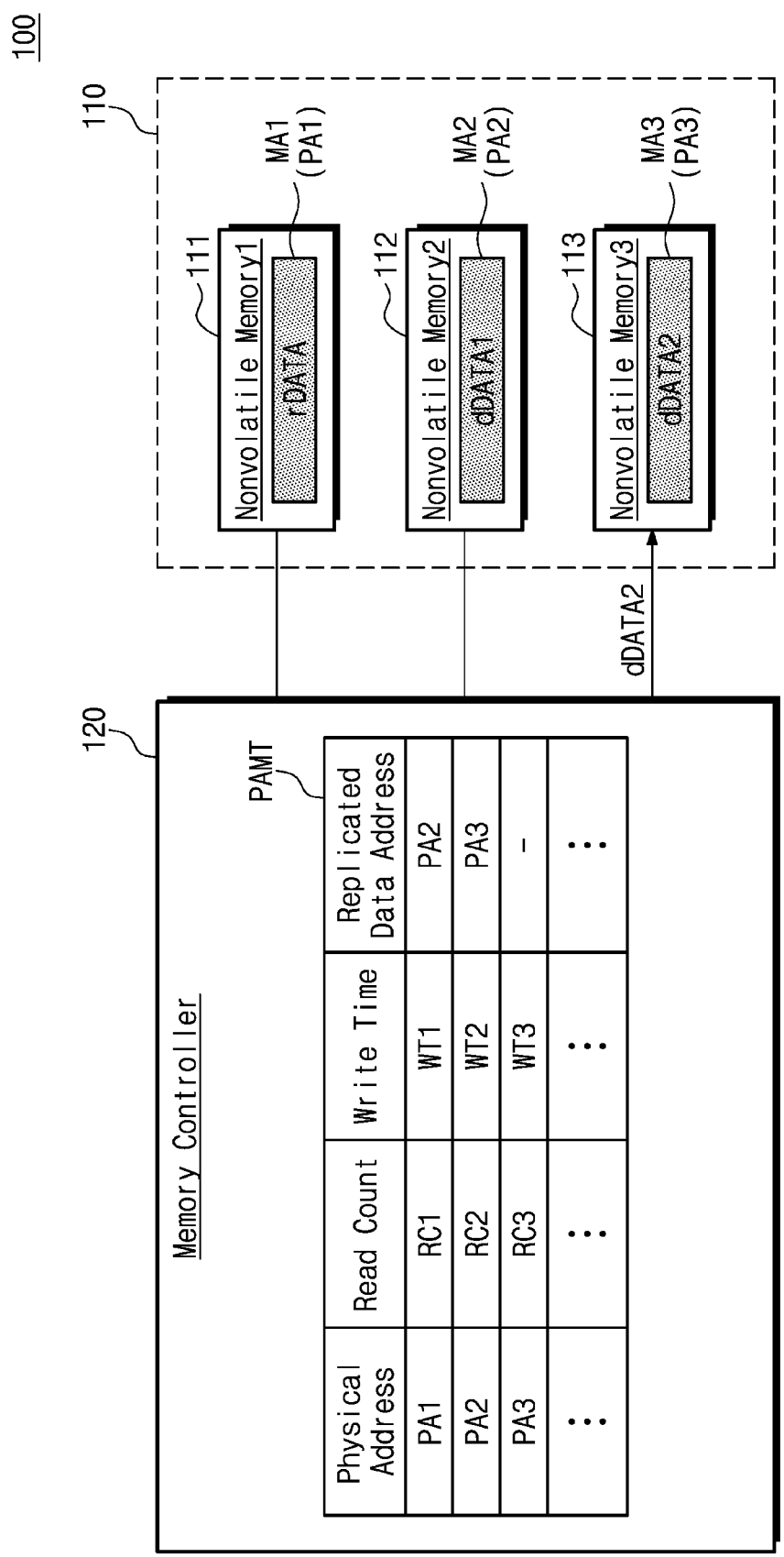

FIGS. 7A and 7B illustrate examples in which a storage device of FIG. 1 generates replicated data according to example embodiments of the inventive concept. For convenience of description, it is assumed that reference data rDATA are stored in the first memory area MA1 corresponding to the first physical address PA1 depending on the deduplication operation described with reference to FIG. 3.

Referring to FIG. 7A, the memory controller 120 may generate replicated data based on a physical address management table PAMT for managing meta data associated with a physical address. The physical address management table PAMT may include fields of a physical address where data are written, a read count of data, a write time, and a replicated data address. Here, the replicated data address indicates a physical address of a memory area where replicated data associated with data are stored, when the replicated data are generated. For example, when replicated data associated with reference data are not generated, a replicated data address corresponding to a physical address of the reference data may be a null value. For example, the physical address management table PAMT may be stored in the RAM 123 of FIG. 2 and may be managed by the FTL 128.

The memory controller 120 may add information about the first physical address PA1 to the physical address management table PAMT as the reference data rDATA are stored in the first memory area MA1. For example, the memory controller 120 may store a first read count RC1 as the read count of the reference data rDATA in the physical address management table PAMT and may store a first write time WT1 as the write time in the physical address management table PAMT. The memory controller 120 may monitor an access operation to the reference data rDATA and may update the first read count RC1 depending on a monitoring result. As not illustrated in FIG. 7A, the memory controller 120 may manage a deduplication ratio associated with the reference data rDATA.

The memory controller 120 may generate first replicated data dDATA1 depending on information associated with the reference data rDATA. In an exemplary embodiment (refer to FIG. 4), the memory controller 120 may generate the first replicated data dDATA1 associated with the reference data rDATA depending on the first read count RC1 corresponding to the reference data rDATA. For example, the memory controller 120 may calculate an access frequency of the reference data rDATA depending on an increment of the first read count RC1 during a particular time period. In the case where the access frequency of the reference data rDATA exceeds a first reference value, the memory controller 120 may generate the first replicated data dDATA1 associated with the reference data rDATA.

In another exemplary embodiment (refer to FIG. 5), the memory controller 120 may generate the first replicated data dDATA1 associated with the reference data rDATA depending on a deduplication ratio corresponding to the reference data rDATA. For example, when the deduplication ratio exceeds a reference ratio, the memory controller 120 may generate the first replicated data dDATA1.

In another exemplary embodiment (refer to FIG. 6), the memory controller 120 may generate the first replicated data dDATA1 associated with the reference data rDATA depending on the first write time WT1 corresponding to the reference data rDATA. For example, the memory controller 120 may calculate a data retention time based on the first write time WT1 and a current time. In the case where the data retention time associated with the reference data rDATA exceeds a reference time, the memory controller 120 may generate the first replicated data dDATA1 associated with the reference data rDATA.

The memory controller 120 may store the first replicated data dDATA1 in the second memory area MA2 of the second nonvolatile memory 112 different from the first memory area MA1 of the first nonvolatile memory 111 where the reference data rDATA are stored.

The memory controller 120 may store the second physical address PA2 of the second memory area MA2, in which the first replicated data dDATA1 are stored, in the physical address management table PAMT so as to correspond to the first physical address PA1. The memory controller 120 may add meta data corresponding to the second physical address PA2 to the physical address management table PAMT as the first replicated data dDATA1 are stored in the second memory area MA2. For example, the memory controller 120 may store a second read count RC2 as the read count of the first replicated data dDATA1 in the physical address management table PAMT and may store a second write time WT2 as the write time in the physical address management table PAMT. The memory controller 120 may monitor an access operation to the first replicated data dDATA1 and may update the second read count RC2 depending on a monitoring result.

Referring to FIG. 7B, after the first replicated data dDATA1 are stored in FIG. 7A, the memory controller 120 may generate second replicated data dDATA2 depending on information associated with the reference data rDATA or the first replicated data dDATA1. In an exemplary embodiment (refer to FIGS. 4 and 5), the memory controller 120 may generate the second replicated data dDATA2 associated with the reference data rDATA depending on the first read count RC1 corresponding to the reference data rDATA or the second read count RC2 corresponding to the first replicated data dDATA1. For example, the memory controller 120 may calculate a first access frequency of the reference data rDATA depending on an increment of the first read count RC1 during a particular time period and may calculate a second access frequency of the first replicated data dDATA1 depending on an increment of the second read count RC2 during a particular time period. In the case where the first access frequency or the second access frequency exceeds the first reference value, the memory controller 120 may generate the second replicated data dDATA2 associated with the reference data rDATA.

In another exemplary embodiment (refer to FIG. 6), the memory controller 120 may generate the second replicated data dDATA2 associated with the reference data rDATA depending on the second write time WT2 corresponding to the first replicated data dDATA1. For example, the memory controller 120 may calculate a data retention time associated with the second replicated data dDATA2 based on the second write time WT2 and a current time. In the case where the data retention time associated with the second replicated data dDATA2 exceeds a reference time, the memory controller 120 may generate the second replicated data dDATA2 associated with the reference data rDATA. In this case, the memory controller 120 may generate the second replicated data dDATA2 based on the first replicated data dDATA1.

The memory controller 120 may store the second replicated data dDATA2 in the third memory area MA3 of the third nonvolatile memory 113 different from the first and second memory areas MA1 and MA2 of the first and second nonvolatile memories 111 and 112, respectively, where the reference data rDATA and the first replicated data dDATA1 are stored.

The memory controller 120 may store the third physical address PA3 of the third memory area MA3, in which the second replicated data dDATA2 are stored, in the physical address management table PAMT so as to correspond to the second physical address PA2. As such, the first physical address PA1 corresponding to the reference data rDATA may indicate the second physical address PA2, and the second physical address PA2 may indicate the third physical address PA3. For example, the first to third physical addresses PA1 to PA3 corresponding to the reference data rDATA and the first and second replicated data dDATA1 and dDATA2 may be managed at the physical address management table PAMT in the form of a linked list. As such, the second and third physical addresses PA2 and PA3 may correspond to the first physical address PA1.

The memory controller 120 may add meta data corresponding to the third physical address PA3 to the physical address management table PAMT as the second replicated data dDATA2 are stored in the third memory area MA3. For example, the memory controller 120 may store a third read count RC3 as the read count of the second replicated data dDATA2 in the physical address management table PAMT and may store a third write time WT3 as the write time in the physical address management table PAMT. The memory controller 120 may monitor an access operation to the second replicated data dDATA2 and may update the third read count RC3 depending on a monitoring result.

As described above, a link relationship of physical addresses at which reference data and replicated data are written may be managed through the physical address management table PAMT, but the inventive concept is not limited thereto. For example, a link relationship of physical addresses at which reference data and replicated data are written may be managed through the address mapping table AMT of FIG. 3.

The description is given with reference to FIGS. 7A and 7B as reference data and replicated data are stored in different nonvolatile memories, but the inventive concept is not limited thereto. For example, the reference data and the replicated data may be stored in the same nonvolatile memory (For example, the first nonvolatile memory 111). In this case, to reduce the read disturbance, the reference data and the replicated data may not be stored in adjacent memory areas.

As described above, the storage device 100 may generate the replicated data depending on an access frequency of the reference data rDATA. The access frequency of the reference data rDATA may be calculated based on an access frequency of a memory area where the reference data rDATA are stored, but the inventive concept is not limited thereto. For example, the access frequency of the reference data rDATA may be calculated based on an access frequency of a memory area where the reference data rDATA are stored and an access frequency of a particular memory area, for example, adjacent to the memory area where the reference data rDATA are stored (hereinafter, the example of an adjacent memory area is used as the particular memory area).

Below, an operation of reading the reference data rDATA stored in the nonvolatile memories 110 will be more described with reference to FIGS. 8 and 9.

Figure 8:
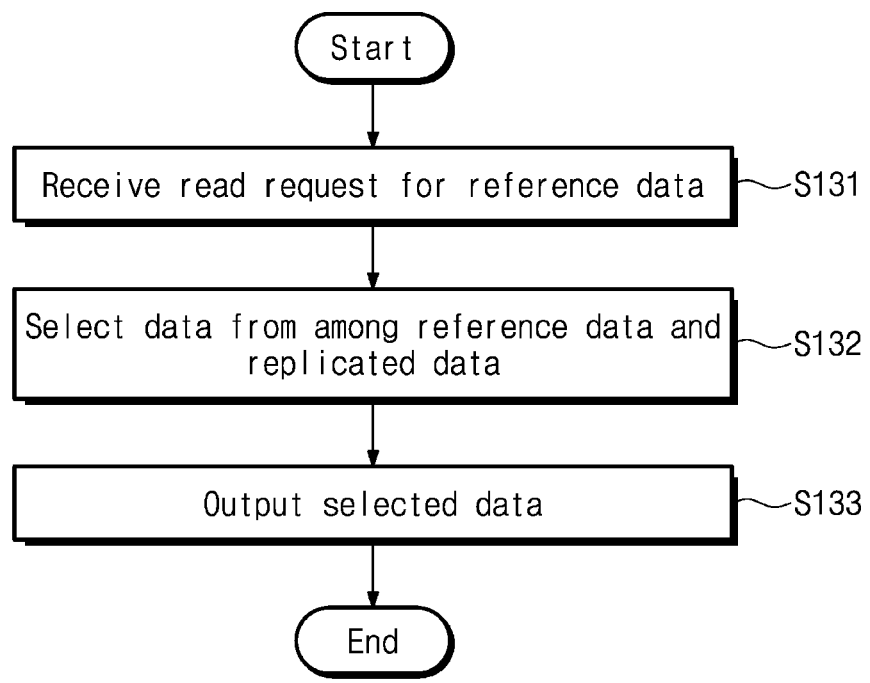
FIG. 8 is a flowchart illustrating a read operation in which a storage device of FIG. 1 reads reference data, according to example embodiments.

FIG. 8 is a flowchart illustrating a read operation in which a storage device of FIG. 1 reads reference data, according to example embodiments. Operations illustrated in FIG. 8 may be performed after replicated data associated with reference data are stored in a nonvolatile memory, as described with reference to FIGS. 4 to 6, 7A and 7B.

Referring to FIGS. 1 and 8, in operation S131, the storage device 100 may receive a read request for the reference data. For example, the storage device 100 may receive a read command associated with the reference data from the host device 200.

In operation S132, the storage device 100 may select one of the reference data and the replicated data. Because the replicated data have the same value as the reference data, the selected data may be identical to the read-requested reference data. In an exemplary embodiment, the storage device 100 may select data based on a read count of the reference data, the number of PIE cycles, and a read count of data stored in an adjacent memory area. For example, the storage device 100 may select data having the smallest read count from among the reference data and the replicated data.

For another example, the storage device 100 may select data depending on a given order. For example, in the case where the reference data and two replicated data exist, the storage device 100 may select the reference data in response to a first read command. The storage device 100 may select one replicated data in response to a second read command and may select the other replicated data in response to a third read command.

In operation S133, the storage device 100 may output the selected data. For example, the storage device 100 may provide the selected data to the host device 200.

As described above, in the case of receiving a read request for the reference data, the storage device 100 may output the replicated data, and thus, accesses to the reference data may be distributed. As such, an error due to the read disturbance may be decreased, and the reliability of data may be improved.

The read operation of the storage device 100 described with reference to FIG. 8 is an exemplary operation, and the inventive concept is not limited thereto. For example, in the case where a read request for reference data is received from the host device 200, the storage device 100 may output a sector corresponding to a portion of reference data and a sector corresponding to a portion of replicated data and may provide the host device 200 with data having the same value as the reference data based on the output sectors.

Figure 9:
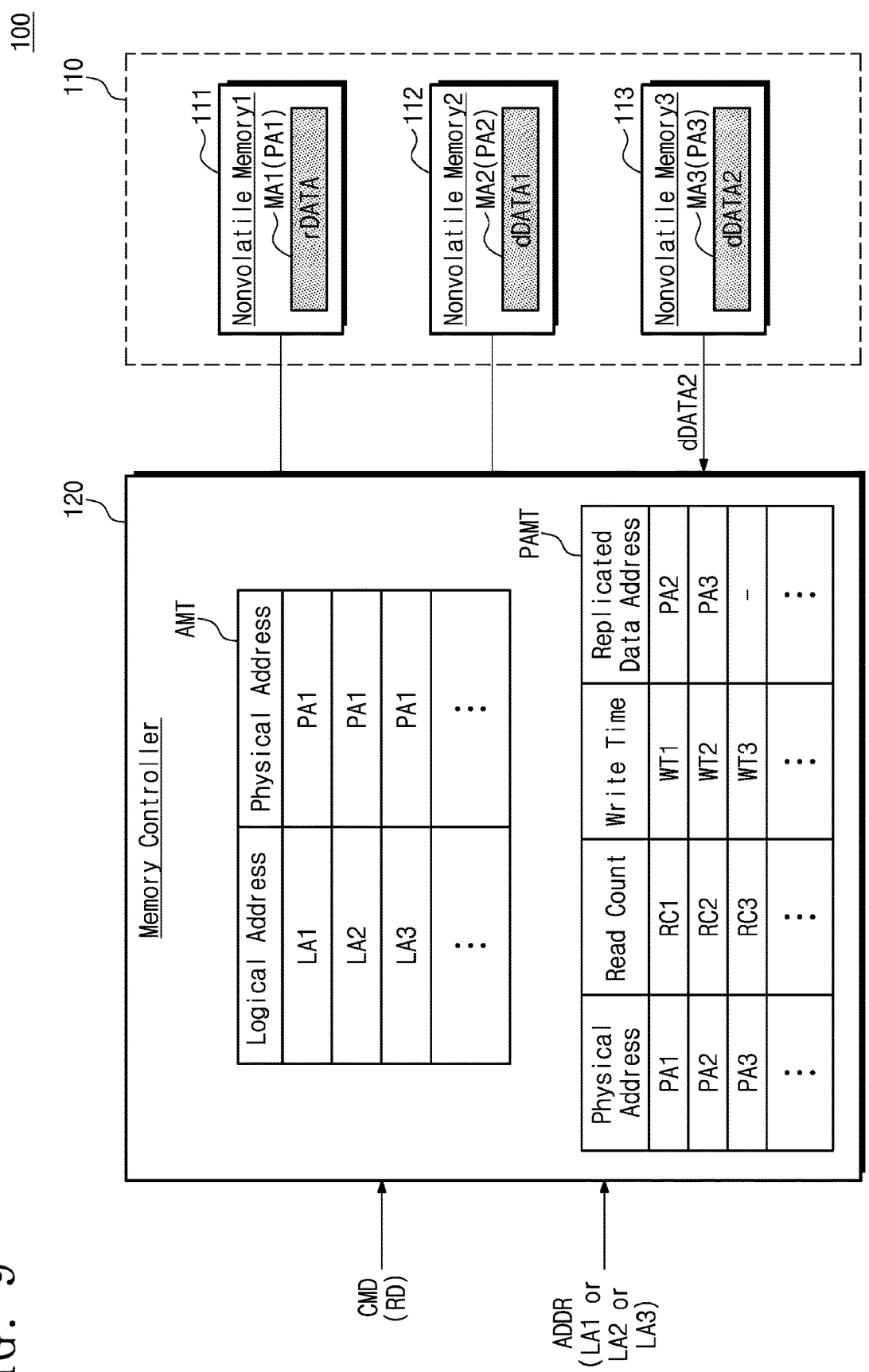
FIG. 9 illustrates an example in which a storage device of FIG. 1 performs a read operation according to an example embodiment of the inventive concept.

FIG. 9 illustrates an example in which a storage device of FIG. 1 performs a read operation according to an example embodiment of the inventive concept. For convenience of description, it is assumed that, depending on the deduplication operation of the storage device 100, the reference data rDATA are stored in the first memory area MA1 corresponding to the first physical address PA1 and the address mapping table AMT of the memory controller 120 stores the first physical address PA1 so as to correspond to the first to third logical addresses LA1 to LA3.

Referring to FIG. 9, the nonvolatile memories 110 may store the reference data rDATA and the first and second replicated data dDATA1 and dDATA2, as described with reference to FIGS. 4 to 6, 7A and 7B. The reference data rDATA may be stored in the first memory area MA1 of the first nonvolatile memory 111, the first replicated data dDATA1 may be stored in the second memory area MA2 of the second nonvolatile memory 112, and the second replicated data dDATA2 may be stored in the third memory area MA3 of the third nonvolatile memory 113. As such, meta data corresponding to the first to third physical addresses PA1 to PA3 may be stored in the physical address management table PAMT of the memory controller 120.

The memory controller 120 may receive a command CMD indicating a read operation RD for reading the reference data rDATA and an address ADDR from the host device 200. For example, the address ADDR may include one of the first logical address LA1, the second logical address LA2, or the third logical address LA3.

As illustrated in FIG. 9, the memory controller 120 may output the second replicated data dDATA2 among the reference data rDATA and the first and second replicated data dDATA1 and dDATA2 in response to the command CMD. For example, the memory controller 120 may compare the first read count RC1 of the reference data rDATA, the second read count RC2 of the first replicated data dDATA1, and the third read count RC3 of the second replicated data dDATA2. The memory controller 120 may select the second replicated data dDATA2 having the third read count RC3 being the smallest, depending on a comparison result. The memory controller 120 may output the selected second replicated data dDATA2 from the third nonvolatile memory 113. As such, the memory controller 120 may provide the second replicated data dDATA2 to the host device 200 in response to the command CMD from the host device 200.

Below, an operation in which the storage device 100 removes reference data or replicated data will be described in detail with reference to FIGS. 10, 11A, 11B, 12A and 12B.

Figure 10:
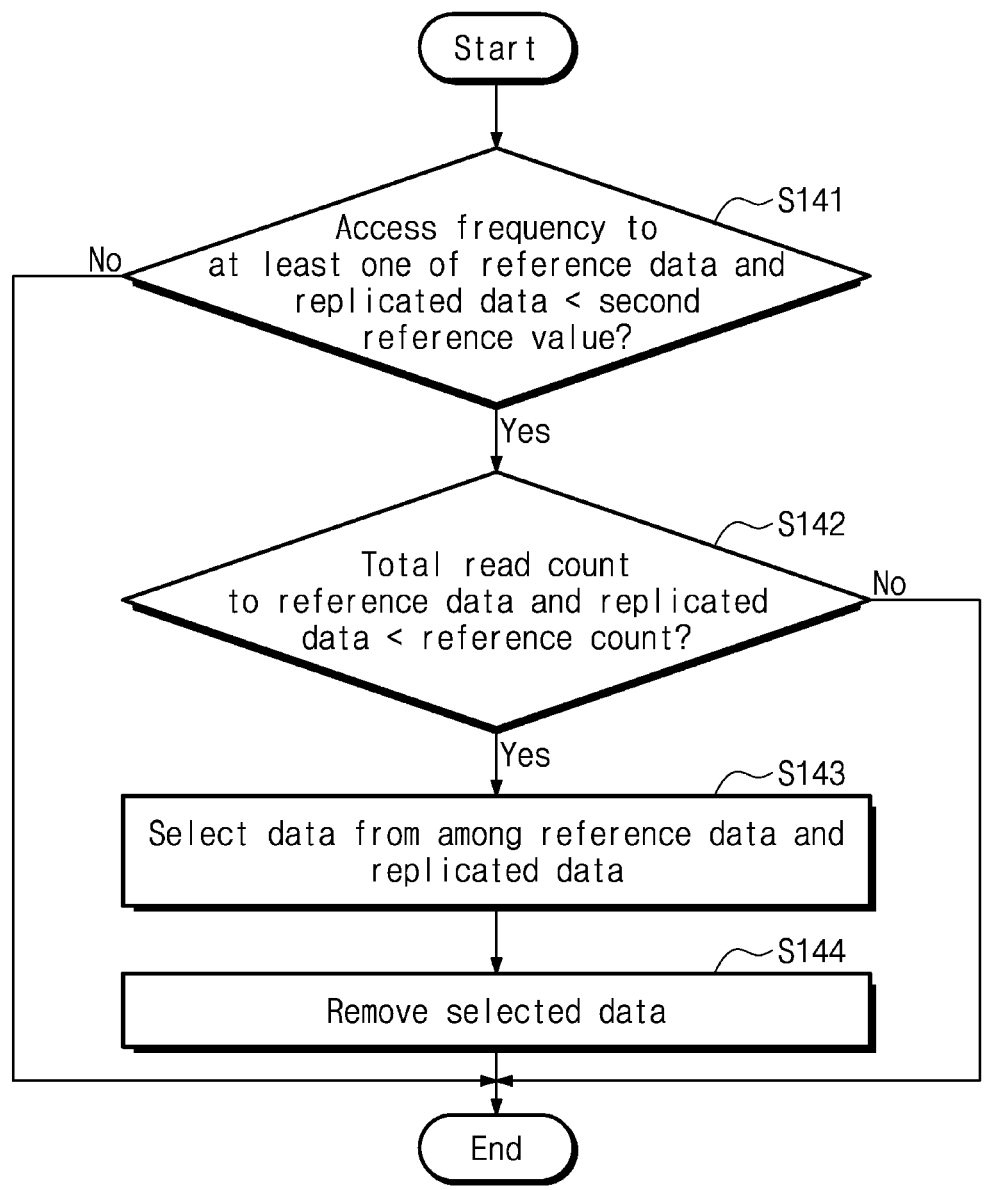
FIG. 10 is a flowchart illustrating an exemplary operation in which a storage device of FIG. 1 removes reference data or replicated data, according to example embodiments.

FIG. 10 is a flowchart illustrating an exemplary operation in which a storage device of FIG. 1 removes reference data or replicated data, according to example embodiments. Operations illustrated in FIG. 10 may be performed after replicated data are generated, as described with reference to FIGS. 4 to 6, 7A and 7B.

Referring to FIGS. 1 and 10, in operation S141, the storage device 100 may determine whether an access frequency of at least one of the reference data and the replicated data is smaller than a second reference value. For example, the storage device 100 may determine whether an access frequency calculated based on a read count of the reference data during a particular time period is smaller than the second reference value. For another example, the storage device 100 may determine whether an access frequency calculated based on a read count of the replicated data during the particular time period is smaller than the second reference value. For example, the storage device 100 may determine whether an access frequency calculated based on a sum of read counts of the reference data and the replicated data during the particular time period is smaller than the second reference value. For example, the second reference value may be equal to the first reference value for generating the replicated data or may be smaller than the first reference value.

When the access frequency of at least one of the reference data and the replicated data is smaller than the second reference value, in operation S142, the storage device 100 may determine whether a total read count of the reference data and the replicated data is smaller than a reference count. For example, in the storage device 100, data stored therein may have a limited readable count. In this case, a total readable count of the reference data and the replicated data may be fixed. In the case where the total read count of the reference data and the replicated data is smaller than the reference count, the storage device 100 may determine that a sufficient readable count remains with regard to the reference data and the replicated data. For example, it may be determined that read operations are sufficiently performed based on the remaining data even though one of the reference data or the replicated data is removed.

When the total read count of the reference data and the replicated data is smaller than the reference count, in operation S143, the storage device 100 may select one of the reference data and the replicated data. For example, the storage device 100 may select the oldest data (i.e., data of the earliest write time). In this case, the reference data may be selected. For another example, the storage device 100 may select data having the greatest read count from among the reference data and the replicated data.

In operation S144, the storage device 100 may remove the selected data. For example, the storage device 100 may perform garbage collection to remove the selected data. As the selected data are removed, a memory space where the selected data have been stored may be additionally secured as a usable memory area.

As described above, the storage device 100 may remove the reference data and the replicated data depending on an access frequency of data after the replicated data are generated. In the case where it is determined that data are rarely accessed after the replicated data are generated and there is no problem with a read operation even though a part of a plurality of data having the same value is removed, the storage device 100 may remove the reference data or the replicated data. As such, the available capacity of the storage device 100 may be additionally secured.

Figure 11A:
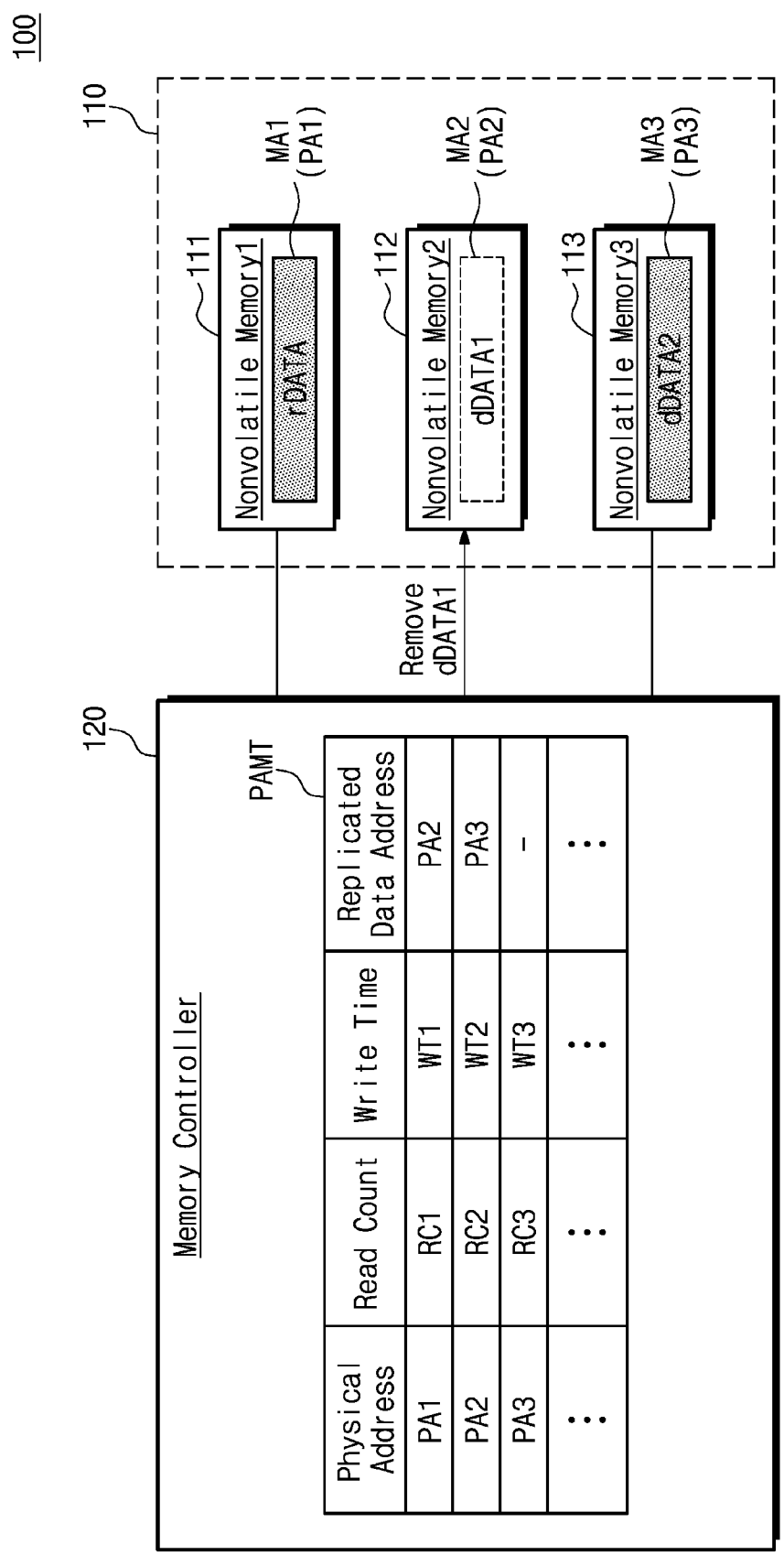
FIGS. 11A and 11B illustrate examples in which a storage device of FIG. 1 removes replicated data according to example embodiments of the inventive concept.
Figure 11B:
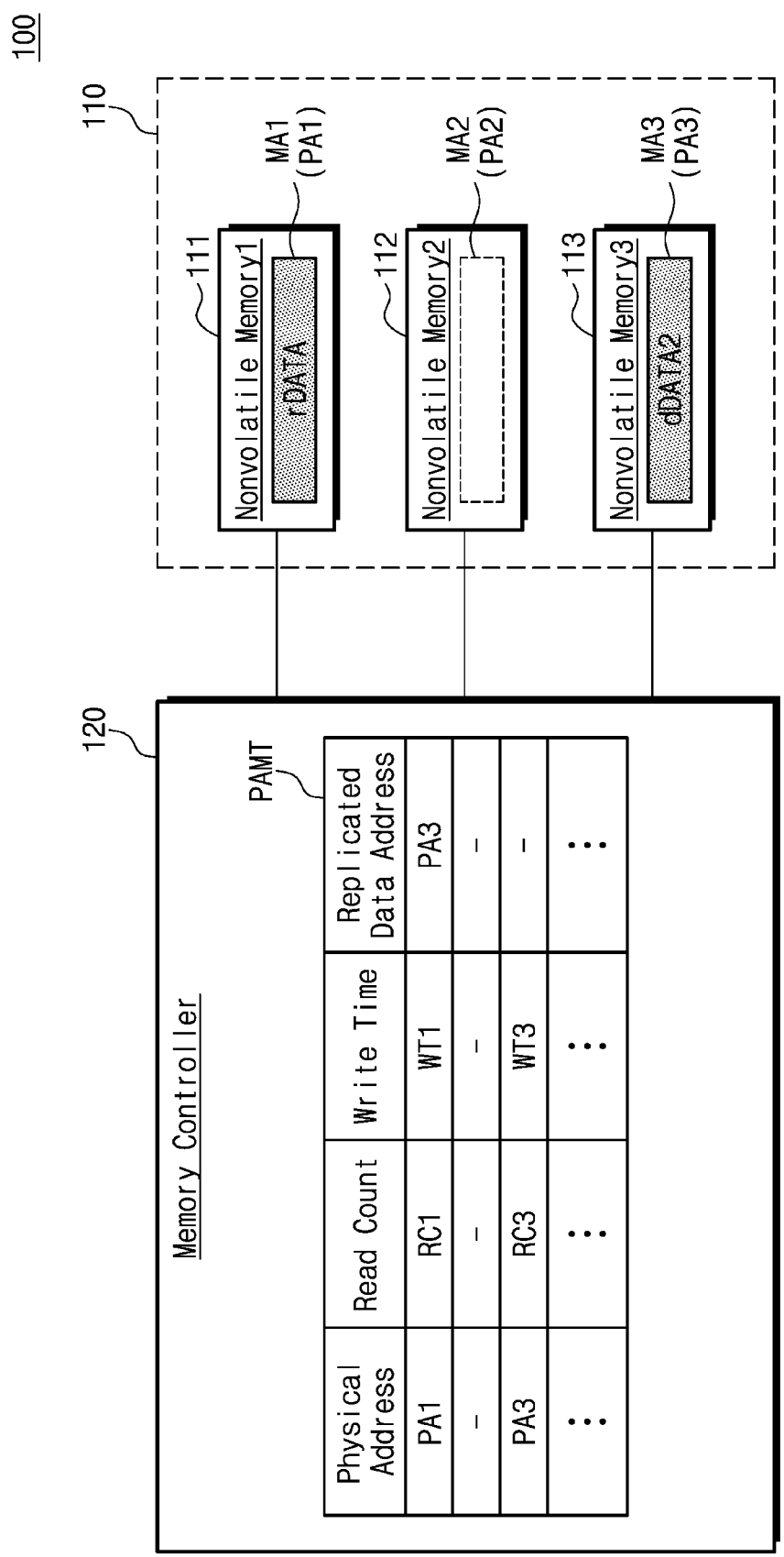

FIGS. 11A and 11B illustrate examples in which a storage device of FIG. 1 removes replicated data according to example embodiments of the inventive concept. For convenience of description, it is assumed that the first replicated data dDATA1 are removed after the first and second replicated data dDATA1 and dDATA2 are stored in the nonvolatile memories 110 depending on the replicated data generating operation of FIGS. 7A and 7B.

Referring to FIG. 11A, the memory controller 120 may calculate an access frequency of at least one of the reference data rDATA and the first and second replicated data dDATA1 and dDATA2. For example, the memory controller 120 may calculate an access frequency of the reference data rDATA depending on the first read count RC1 of the reference data rDATA. For example, the memory controller 120 may calculate an access frequency (i.e., a total access frequency) to the reference data rDATA and the first and second replicated data dDATA1 and dDATA2 based on the first read count RC1 of the reference data rDATA, the second read count RC2 of the first replicated data dDATA1, and the third read count RC3 of the second replicated data dDATA2.

When an access frequency of at least one of the reference data rDATA and the first and second replicated data dDATA1 and dDATA2 is smaller than the second reference value, the memory controller 120 may calculate the total read count of the reference data rDATA and the first and second replicated data dDATA1 and dDATA2.

When the total read count is smaller than the reference count, the memory controller 120 may select the first replicated data dDATA1 from the reference data rDATA and the first and second replicated data dDATA1 and dDATA2 for the purpose of removing redundant data. For example, the memory controller 120 may determine that the second read count RC2 of the first to third read counts RC1 to RC3 is the greatest and may select the first replicated data dDATA1 corresponding to the second read count RC2. For another example, the memory controller 120 may determine that the second write time WT2 from among the first to third write times WT1 to WT3 is the earliest and may select the first replicated data dDATA1 corresponding to the second write time WT2.

As illustrated in FIG. 11A, the memory controller 120 may remove the first replicated data dDATA1 selected. For example, the memory controller 120 may remove data stored in the second memory area MA2, in which the first replicated data dDATA1 are stored, through the garbage collection.

Referring to FIG. 11B, as the first replicated data dDATA1 are removed, the memory controller 120 may update the physical address management table PAMT. For example, the memory controller 120 may delete meta data corresponding to the second physical address PA2 and may store the third physical address PA3 as a replicated data address corresponding to the first physical address PA1.

Figure 12A:
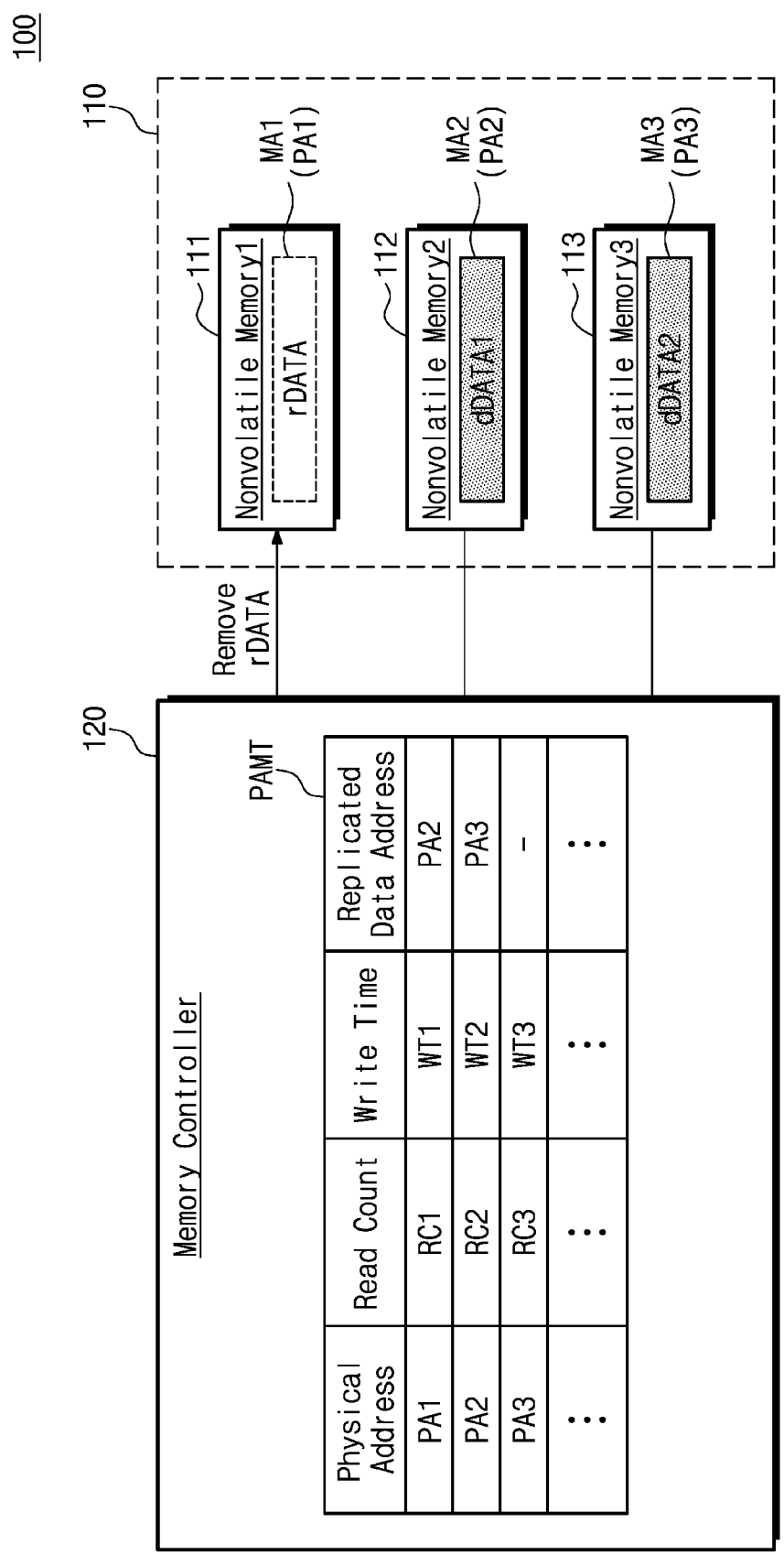
FIGS. 12A and 12B illustrate examples in which a storage device of FIG. 1 removes reference data according to example embodiments of the inventive concept.
Figure 12B:
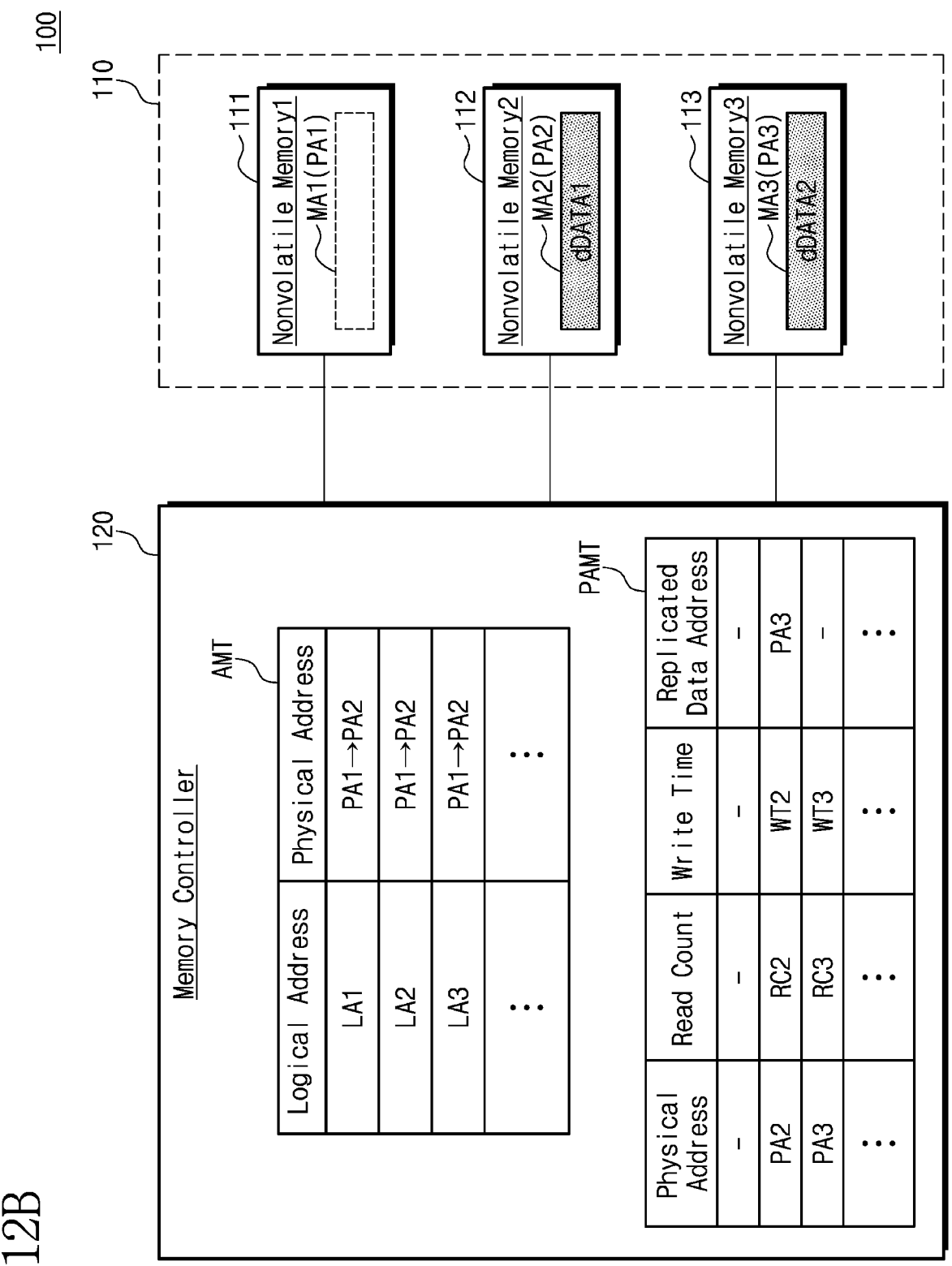

FIGS. 12A and 12B illustrate examples in which a storage device of FIG. 1 removes reference data according to example embodiments of the inventive concept. For convenience of description, it is assumed that the reference data rDATA are removed after the first and second replicated data dDATA1 and dDATA2 are stored in the nonvolatile memories 110 depending on the replicated data generating operation of FIGS. 7A and 7B.

Referring to FIG. 12A, the memory controller 120 may calculate an access frequency of at least one of the reference data rDATA and the first and second replicated data dDATA1 and dDATA2. When an access frequency of at least one of the reference data rDATA and the first and second replicated data dDATA1 and dDATA2 is smaller than the second reference value, the memory controller 120 may calculate the total read count of the reference data rDATA and the first and second replicated data dDATA1 and dDATA2.

When the total read count is smaller than the reference count, the memory controller 120 may select the reference data rDATA from the reference data rDATA and the first and second replicated data dDATA1 and dDATA2 for the purpose of removing redundant data. For example, the memory controller 120 may determine that the first read count RC1 of the first to third read counts RC1 to RC3 is the greatest and may select the reference data rDATA corresponding to the first read count RC1. For another example, the memory controller 120 may determine that the first write time WT1 from among the first to third write times WT1 to WT3 is the earliest and may select the reference data rDATA corresponding to the first write time WT1.

As illustrated in FIG. 12A, the memory controller 120 may remove the reference data rDATA selected. For example, the memory controller 120 may remove data sorted in the first memory area MA1, in which the reference data rDATA are stored, through the garbage collection.

Referring to FIG. 12B, as the reference data rDATA are removed, the memory controller 120 may update the physical address management table PAMT. For example, the memory controller 120 may delete meta data corresponding to the first physical address PA1. Also, as the reference data rDATA are removed, the memory controller 120 may update the address mapping table AMT where the first physical address PA1 is stored. For example, the memory controller 120 may remap physical addresses corresponding to the first to third logical addresses LA1 to LA3 onto the second physical address PA2. As such, the first replicated data dDATA1 may be treated as the reference data rDATA.

Figure 13:
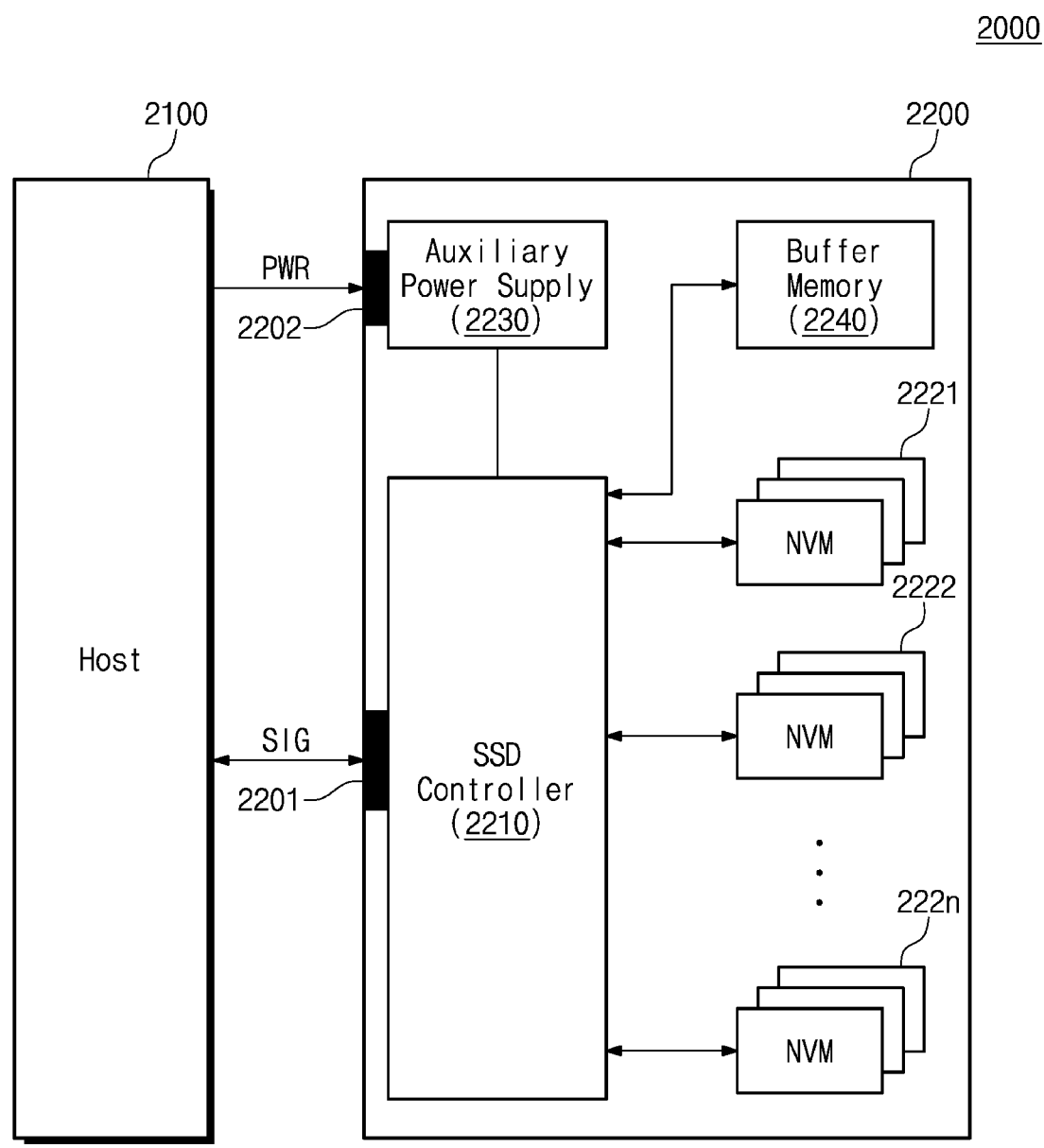
FIG. 13 is a block diagram illustrating an SSD system according to an example embodiment of the inventive concept.

FIG. 13 is a block diagram illustrating an SSD system according to an example embodiment of the inventive concept. Referring to FIG. 13, an SSD system 2000 includes a host 2100 and an SSD 2200.

The SSD 2200 exchanges signals SIG with the host 2100 through a signal connector 2201 and is supplied with a power PWR through a power connector 2202. The SSD 2200 includes an SSD controller 2210, a plurality of flash memories (or, nonvolatile memories) 2221 to 222n, an auxiliary power supply 2230, and a buffer memory 2240. Each of the flash memories 2221 to 222n may be implemented with a separate semiconductor die or a separate semiconductor chip. For example, each of the flash memories 2221 to 222n may correspond to each of the first, second, and third nonvolatile memories 111, 112, and 113 described with reference to FIGS. 1 to 6, 7A, 7B, 8 to 10, 11A, 11B, 12A and 12B.

The SSD controller 2210 may control the flash memories 2221 to 222n in response to the signals SIG received from the host 2100. The flash memories 2221 to 222n may operate under control of the SSD controller 2210. The SSD controller 2210 may include the function of the memory controller 120 described with reference to FIGS. 1 to 6, 7A, 7B, 8 to 10, 11A, 11B, 12A and 12B. For example, the SSD controller 2210 may perform the data deduplication. As such, reference data may be stored in the flash memories 2221 to 222n. The SSD controller 2210 may generate replicated data associated with the reference data when the reference data are frequently accessed. When at least one of the reference data and the replicated data is rarely accessed, the SSD controller 2210 may remove the selected reference data or the selected replicated data.

The auxiliary power supply 2230 is connected with the host 2100 through the power connector 2202. The auxiliary power supply 2230 may be charged by the power PWR supplied from the host 2100. When the power PWR is not smoothly supplied from the host 2100, the auxiliary power supply 2230 may power the SSD 2200.

The buffer memory 2240 operates as a buffer memory of the SSD 2200. For example, the buffer memory 2240 may temporarily store data received from the host 2100 or may temporarily store meta data (e.g., the address mapping table AMT and the physical address management table PAMT) of the flash memories 2221 to 222n. Alternatively, the buffer memory 2240 may temporarily store a variety of information necessary for the SSD controller 2210 to operate.

According to the inventive concept, a storage device may generate replicated data associated with data stored in a nonvolatile memory depending on deduplication. As such, the storage device may distribute access operations to the data stored in the nonvolatile memory into the replicated data after a deduplication operation. Accordingly, the reliability of the storage device may be improved by preventing an error due to a frequent access to the deduplicated data.

Also, according to the inventive concept, after generating the replicated data, the storage device may secure an available capacity of a nonvolatile memory by removing replicated data that are rarely accessed.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. An operating method of a storage device which includes one or more nonvolatile memories, the method comprising:

storing reference data in a first memory area of the one or more nonvolatile memories;

when an access frequency of the reference data exceeds a first reference value, storing first replicated data identical to the reference data in a second memory area of the one or more nonvolatile memories;
after the first replicated data are stored, when an access frequency of the reference data or the first replicated data exceeds the first reference value, storing second replicated data identical to the reference data in a third memory area of the one or more nonvolatile memories;
managing a second physical address of the second memory area and a third physical address of the third memory area such that a first physical address of the first memory area corresponds to the second physical address and the third physical address, as the first and second replicated data are stored in the one or more nonvolatile memories;
selecting one of the reference data, the first replicated data, and the second replicated data in response to a read request for the reference data; and
outputting the selected data from the one or more nonvolatile memories,
wherein the selected data are data corresponding to either the smallest read count from among a first read count of the reference data, a second read count of the first replicated data, and a third read count of the second replicated data or the earliest write time from among a first write time of the reference data, a second write time of the first replicated data, and a third write time of the second replicated data.

2. The method of claim 1, wherein the managing of the second physical address and the third physical address includes:
storing the second physical address in a physical address management table so as to correspond to the first physical address; and
storing the third physical address in the physical address management table so as to correspond to the second physical address.

3. The method of claim 1, further comprising:
storing the first physical address in an address mapping table in response to a write command for storing write data identical to the reference data and a first logical address so as to correspond to the first logical address, after the reference data are stored.

4. The method of claim 3, wherein the access frequency of the reference data varies depending on a read operation associated with the first logical address.

5. The method of claim 1, wherein the access frequency is an increment of a read count of data during a particular time period.

6. The method of claim 1, wherein the first to third memory areas are respectively included in first to third nonvolatile memories of the one or more nonvolatile memories, and
wherein the first to third nonvolatile memories are implemented with different semiconductor dies or different semiconductor chips.

7. A storage device comprising:
one or more nonvolatile memories including a first memory area configured to store reference data; and
a memory controller,
wherein the storage device is configured such that when an access frequency of the reference data exceeds a first reference value, the memory controller stores first replicated data identical to the reference data in a second memory area of the one or more nonvolatile memories,
wherein the storage device is configured such that after the first replicated data are stored, when an access frequency of one of the reference data and the first replicated data exceeds the first reference value, the memory controller stores second replicated data identical to the reference data in a third memory area of the one or more nonvolatile memories,
wherein the storage device is configured such that when an access frequency of at least one of the reference data, the first replicated data, and the second replicated data is smaller than a second reference value and a total read count of the reference data, the first replicated data, and the second replicated is smaller than a reference count, the memory controller removes data selected from the reference data, the first replicated data, and the second replicated data,
wherein the memory controller is configured to:
store a second physical address of the second memory area in an address management table so as to correspond to a first physical address of the first memory area as the first replicated data are stored in the second memory area, and
store a third physical address of the third memory area in the address management table so as to correspond to the second physical address as the second replicated data are stored in the third memory area, and
wherein the selected data are data corresponding to either the greatest read count from among a first read count of the reference data, a second read count of the first replicated data, and a third read count of the second replicated data or the earliest write time from among a first write time of the reference data, a second write time of the first replicated data, and a third write time of the second replicated data.

8. The storage device of claim 7, wherein the storage device is configured such that when the selected data are the first replicated data, the memory controller deletes the second physical address corresponding to the first physical address from the address management table and stores the third physical address in the address management table so as to correspond to the first physical address.

9. An operating method of a storage device which includes one or more nonvolatile memories, the method comprising:
storing reference data in a first memory area of the one or more nonvolatile memories;
when an access frequency of the reference data exceeds a first reference value, storing first replicated data identical to the reference data in a second memory area of the one or more nonvolatile memories;
after the first replicated data are stored, when an access frequency of the reference data or the first replicated data exceeds the first reference value, storing second replicated data identical to the reference data in a third memory area of the one or more nonvolatile memories;
managing a second physical address of the second memory area and a third physical address of the third memory area such that a first physical address of the first memory area corresponds to the second physical address and the third physical address, as the first and second replicated data are stored in the one or more nonvolatile memories;
when an access frequency of at least one of the reference data, the first replicated data, and the second replicated data is smaller than a second reference value and a total read count of the reference data, the first replicated data, and the second replicated data is smaller than a reference count, selecting one of the reference data, the first replicated data, and the second replicated data; and removing the selected data, wherein the selected data are data corresponding to either the greatest read count from among a first read count of the reference data, a second read count of the first replicated data, and a third read count of the second replicated data or the earliest write time from among a first write time of the reference data, a second write time of the first replicated data, and a third write time of the second replicated data.

10. The method of claim 9, wherein the managing of the second physical address and the third physical address includes:

storing the second physical address in a physical address management table so as to correspond to the first physical address; and storing the third physical address in the physical address management table so as to correspond to the second physical address.

* * * * *